United States Patent
Ostrowski

[11] Patent Number: 5,947,479
[45] Date of Patent: *Sep. 7, 1999

[54] MECHANICAL SEAL WITH FLEXIBLE METAL DIAPHRAGM

[75] Inventor: Michael H. Ostrowski, Lake Forest, Ill.

[73] Assignee: John Crane Inc., Morton Grove, Ill.

[ * ] Notice: This patent is subject to a terminal disclaimer.

[21] Appl. No.: 08/414,799

[22] Filed: Mar. 31, 1995

[51] Int. Cl.$^6$ ................................................. F16J 15/36
[52] U.S. Cl. ..................... 277/306; 277/374; 277/384; 277/393
[58] Field of Search ............................... 277/1, 306, 370, 277/371, 374, 375, 377, 379, 384, 385, 391, 393

[56] References Cited

U.S. PATENT DOCUMENTS

| | | |
|---|---|---|
| 1,063,633 | 6/1913 | Wilkinson .................................... 277/89 |
| 1,561,426 | 11/1925 | Fischbacher . |
| 1,780,248 | 11/1930 | Spreen . |
| 2,000,341 | 5/1935 | Larsh .......................................... 277/90 |
| 2,014,932 | 9/1935 | Hallett . |
| 2,167,669 | 8/1939 | Molyneux . |
| 2,189,197 | 2/1940 | Cerny . |
| 2,249,930 | 7/1941 | Bailey et al. . |
| 2,267,994 | 12/1941 | Reynolds et al. . |
| 2,299,590 | 10/1942 | Reynolds . |
| 2,322,834 | 6/1943 | Dornhofer .................................. 277/41 |
| 2,393,260 | 1/1946 | Pardee ........................................ 277/39 |
| 2,446,243 | 8/1948 | Reynolds . |
| 2,465,546 | 3/1949 | Marslek ..................................... 277/90 |
| 2,814,512 | 11/1957 | Quinn et al. . |
| 2,866,656 | 12/1958 | Dobrosavljevic . |
| 2,994,547 | 8/1961 | Dohlun et al. . |
| 3,024,048 | 3/1962 | Kobert . |
| 3,061,318 | 10/1962 | Laser .......................................... 277/42 |
| 3,131,943 | 5/1964 | Mueller ...................................... 277/90 |
| 3,203,704 | 8/1965 | Mueller . |
| 3,332,692 | 7/1967 | Mueller . |
| 3,391,939 | 7/1968 | Mueller . |
| 3,391,941 | 7/1968 | Donley . |
| 3,507,504 | 4/1970 | Donley . |
| 3,575,424 | 4/1971 | Taschenberg . |
| 3,895,811 | 7/1975 | Richard et al. . |
| 3,948,533 | 4/1976 | Novosad . |
| 4,275,889 | 6/1981 | Butler et al. . |
| 4,700,041 | 10/1987 | Morita et al. . |
| 4,754,981 | 7/1988 | Burns . |
| 4,779,876 | 10/1988 | Novosad . |
| 5,123,660 | 6/1992 | Dahlheimer et al. . |
| 5,199,719 | 4/1993 | Heinrich et al. . |
| 5,226,787 | 7/1993 | Freeman . |
| 5,492,340 | 2/1996 | Lederman ................................. 277/88 |
| 5,676,382 | 10/1997 | Dahlheimer et al. . |

FOREIGN PATENT DOCUMENTS

| | | |
|---|---|---|
| 144296 | 11/1951 | Australia . |
| 6115 | 3/1906 | United Kingdom . |
| 308391 | 3/1929 | United Kingdom ..................... 277/88 |
| 548051 | 9/1942 | United Kingdom . |
| 799010 | 7/1958 | United Kingdom . |

*Primary Examiner*—Anthony Knight
*Assistant Examiner*—John L. Beres
*Attorney, Agent, or Firm*—Dorn, McEachran, Jambor & Keating

[57] ABSTRACT

A mechanical end face seal for sealing between a housing and a relatively rotating shaft which includes a pair of relatively rotating annular rings having seal faces in sealing contact with each other to define a seal interface. A generally annular flexible metal diaphragm is secured between an axially movable ring and either the housing or shaft in a configuration such that it is placed in tension to achieve a preload or initial closing force upon the seal faces. In one form the seal components are unitized into a single assembly. A retainer is adapted to be disposed in a bore of the housing in surrounding relation to the shaft. The seal rings are disposed intermediate the axial ends of the retainer with the generally annular flexible metal diaphragm secured to one end of the retainer to define one closure wall of the assembly and to capture the ring components within the retainer.

68 Claims, 6 Drawing Sheets

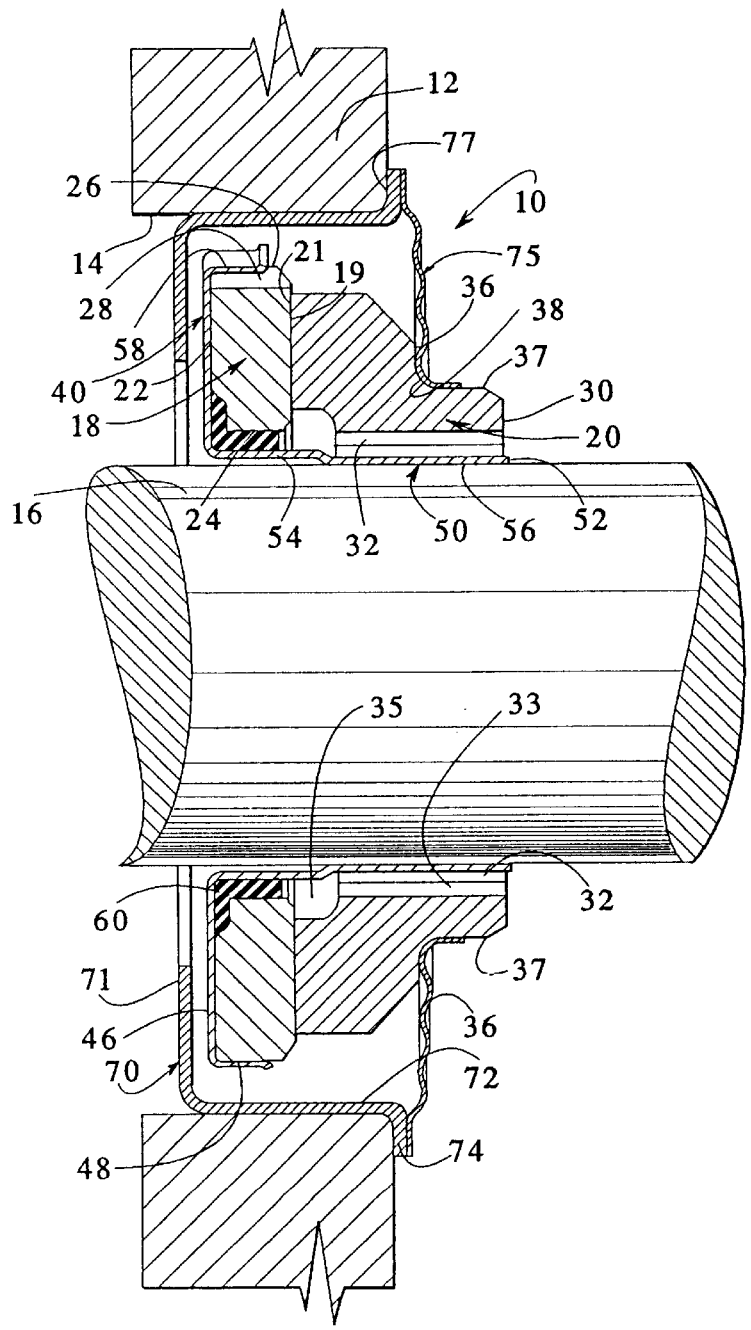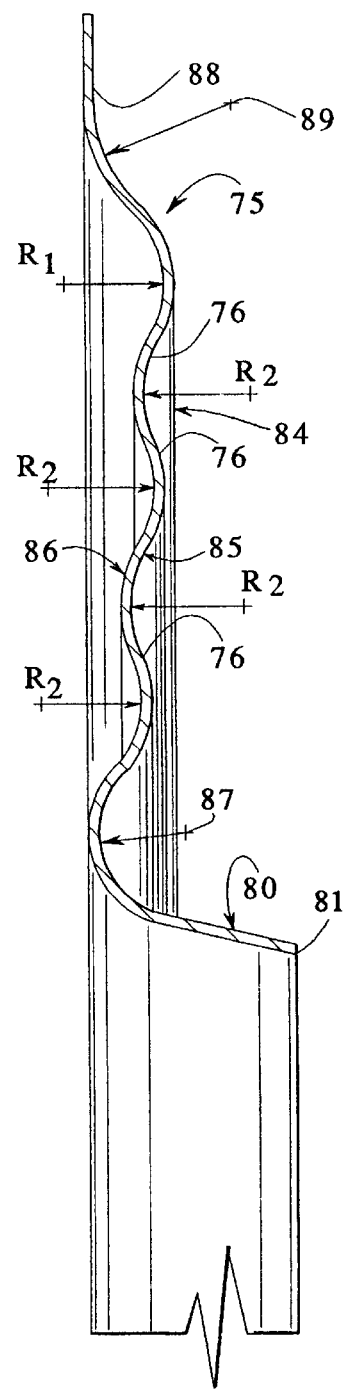

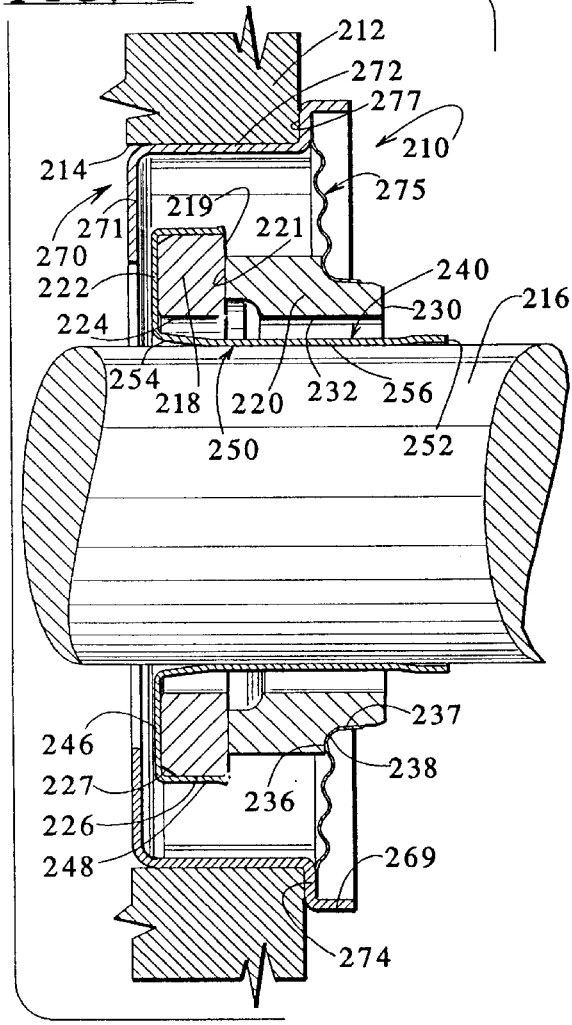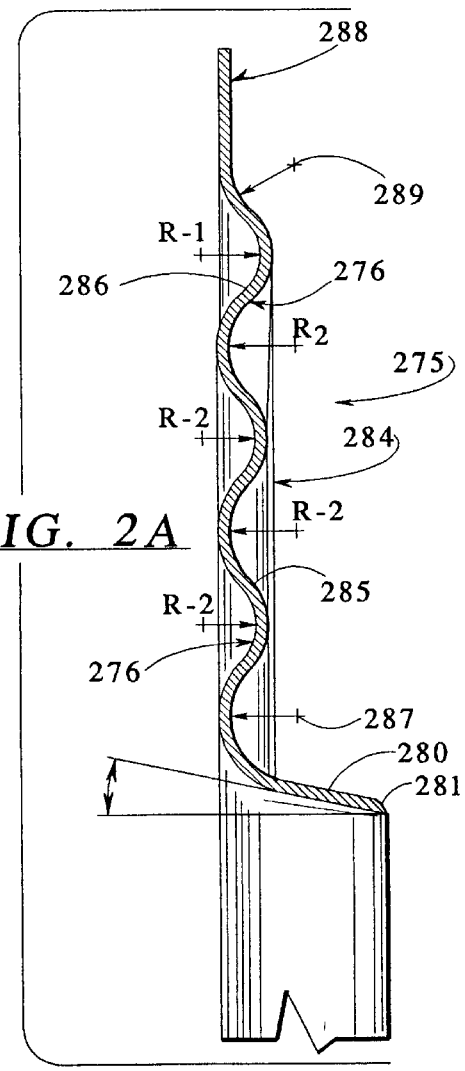

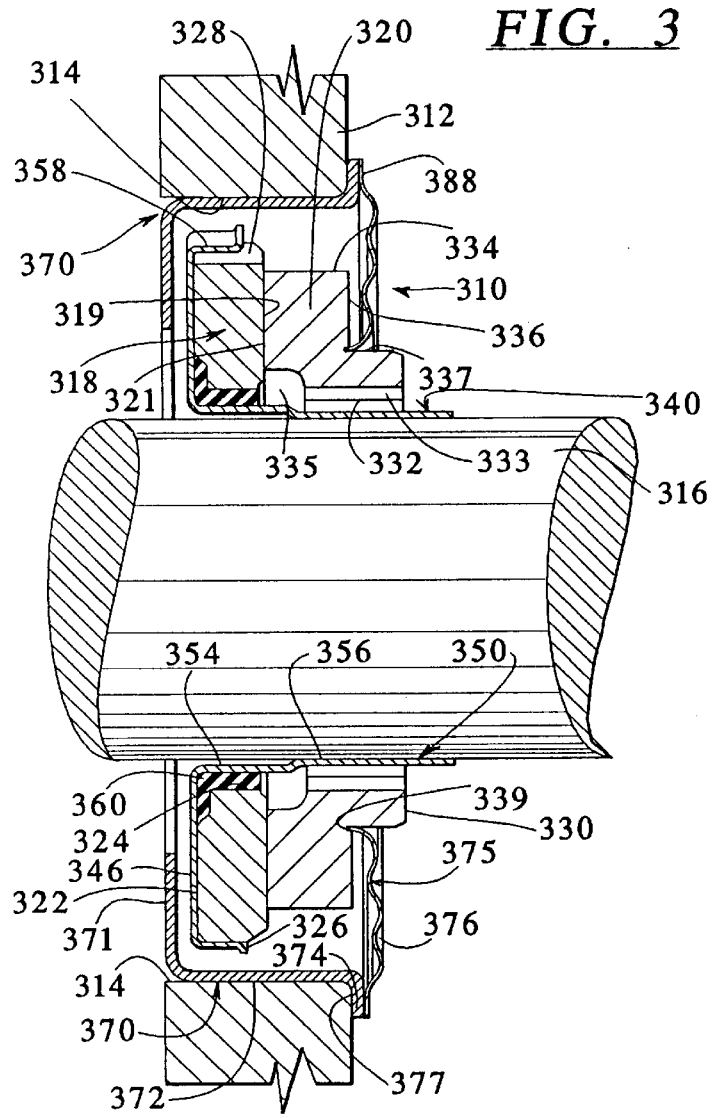
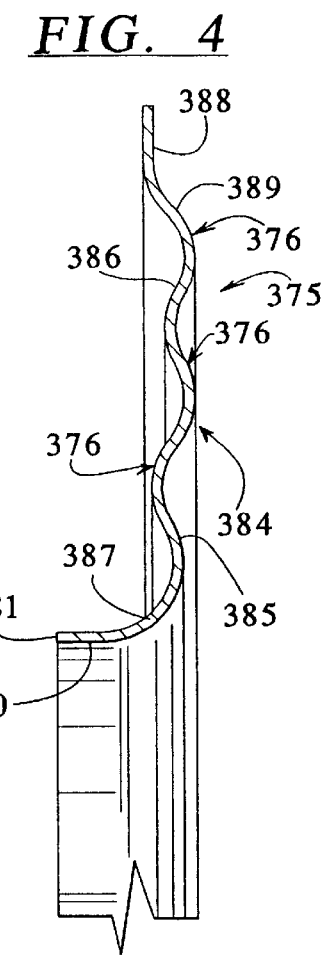
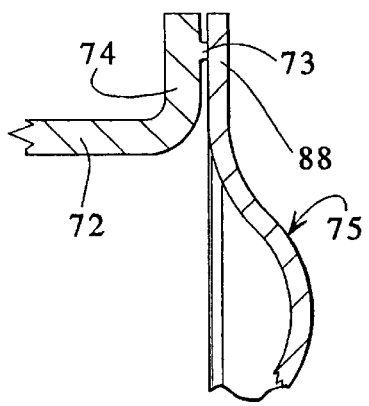
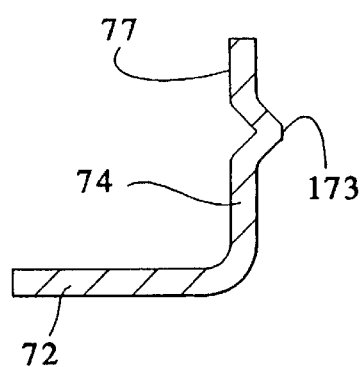
FIG. 3
FIG. 4
FIG. 5
FIG. 6

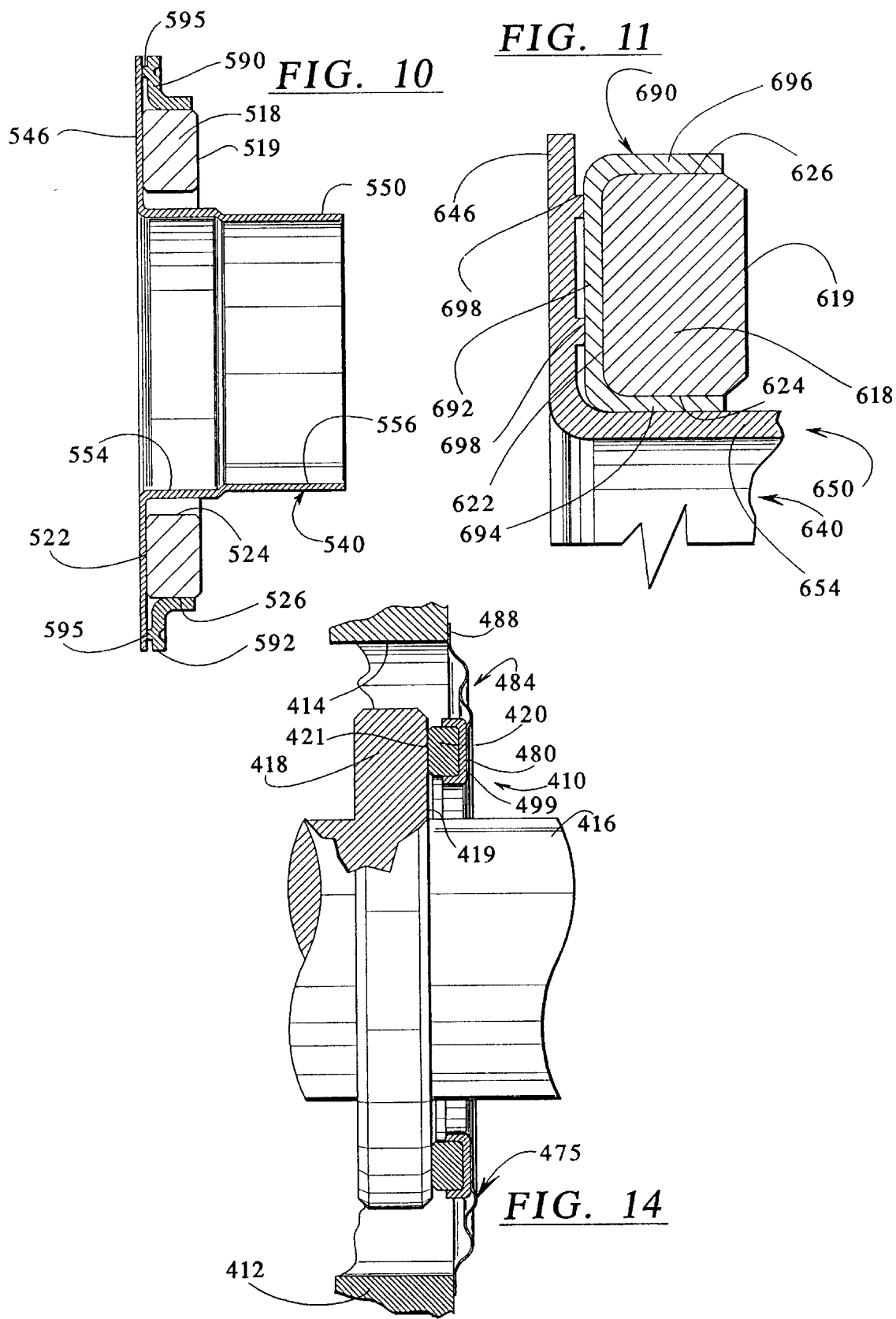

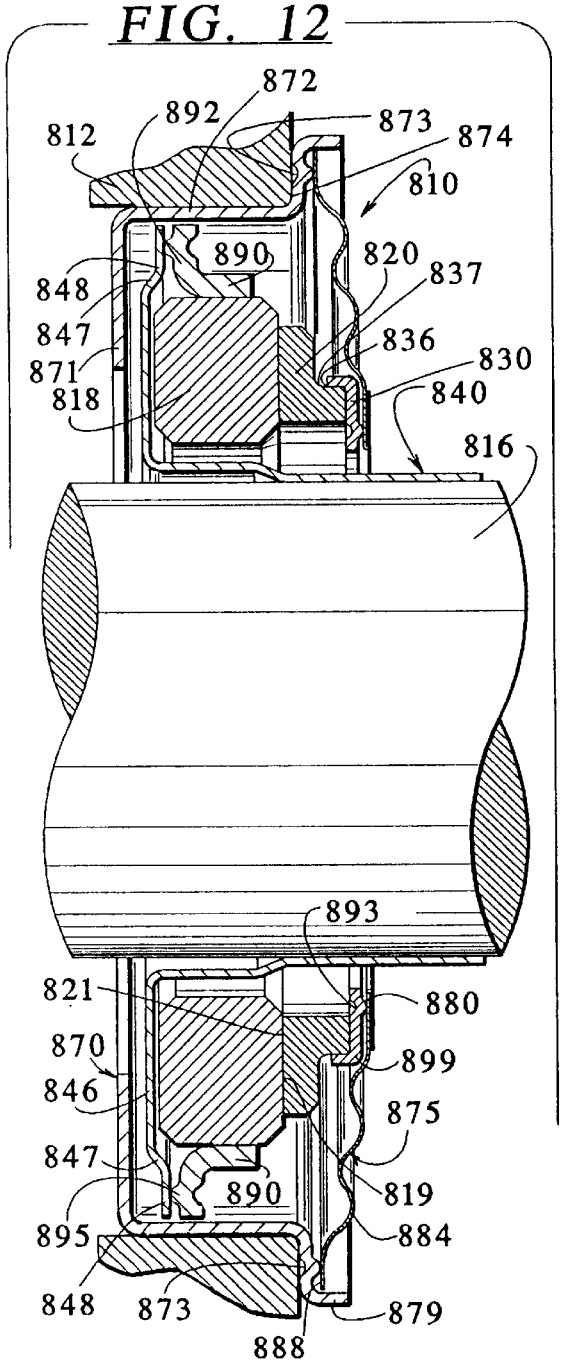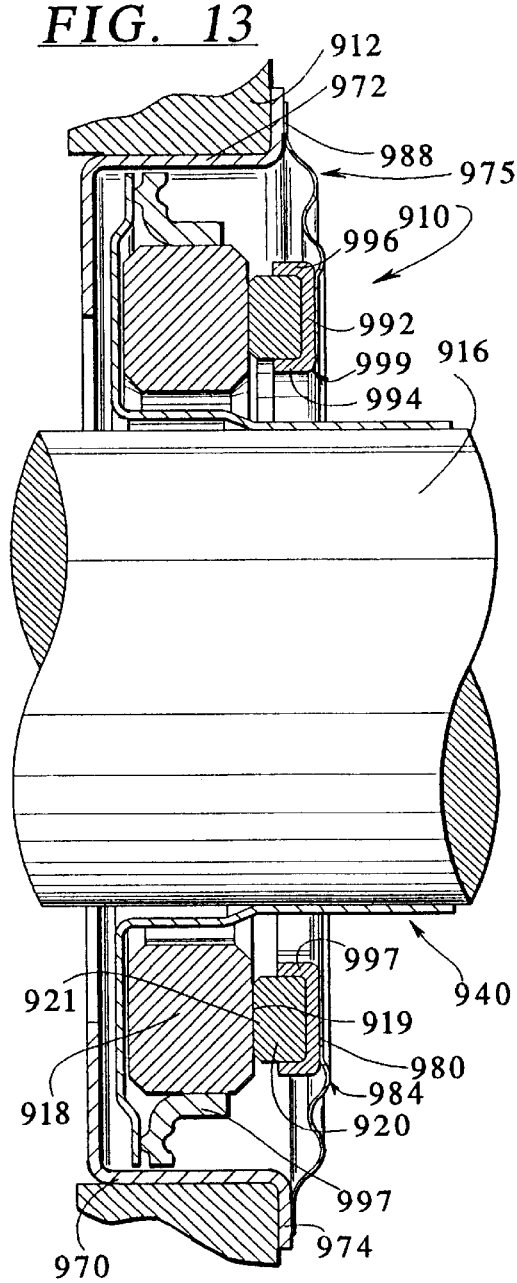

MECHANICAL SEAL WITH FLEXIBLE METAL DIAPHRAGM

BACKGROUND OF THE INVENTION

1. Field of the Invention

This invention relates generally to mechanical end face seals for sealing between a housing and a relatively rotating shaft and more particularly to such seals having a metal diaphragm which provides axial loading of the seal rings and also acts as a secondary seal between one of the seal rings and its associated housing or shaft.

2. Background Art

Mechanical end face seals which provide a fluid-tight seal between a housing and a relatively rotating shaft find general application to a variety of devices, such as liquid pumps, slurry pumps, dry mixers and numerous other devices. Low cost end face seals are used, for example, in a number of high volume applications such as automobile water pumps. Applications involving other process fluids are also common.

Face seals usually comprise two seal rings, having opposed sealing faces, one of which rotates relative to the other. A biasing force is normally provided to urge one seal ring toward the other and to bring the two sealing faces into sealing relation. Secondary seals in some form seal each ring to its associated shaft or housing.

An example of a seal using a coil spring to provide the biasing force can be found in U.S. Pat. No. 3,282,235. A seal using a wave spring is shown in U.S. Pat. No. 4,754,981. These seals use some type of elastomeric component for providing the secondary sealing function. The latter seal is unitized, in that it can be installed into a pump as a unit or sub-assembly.

Seals are known in which the axial bias and the secondary seal between the movable ring and its associated housing or shaft is provided by an annular metal diaphragm or bellows. Such seals generally have higher temperature capability than those using an elastomeric secondary seal as well as potentially having better uniform circumferential loading. Examples of such seals are found in U.S. Pat. Nos. 2,189,197; 3,203,704; 3,332,692 and 3,575,424.

Seals using diaphragms of formed metal are not without complexity. The diaphragm or bellows must be connected to the seal ring and the housing or shaft with which it is associated in fluid-tight relation. These connections pose manufacturing and assembly problems.

Formed metal bellows have traditionally taken the shape of a truncated cone which, when the seal is installed, is placed in compression. Such shapes generally provide a high spring rate which can necessitate high initial face loading with consequent wear. Such seals may experience short life due to loss of adequate closing force as face wear progresses. Also, face loading varies significantly depending on diaphragm deflection. Leakage sometimes results from relaxation of the diaphragm through axial seal ring movement.

Simplicity of installation and removal of seals often dictate cartridge type arrangements which allow all of the seal elements to be preassembled and installed as a unit. There is also the desire to minimize the axial length of the seal assembly thereby minimizing the overall length requirement of the shaft. Reduction in shaft length simplifies bearing requirements and reduces the overall length of the pump or other device in which the seal is utilized.

The present invention incorporates an annular metal diaphragm in a seal assembly such that axial loading of the axially movable seal ring is applied by placing the diaphragm in tension. The diaphragm configuration provides greater flexibility and a resultant spring rate which insures adequate closing force over an acceptable range of axial displacement. This flexibility permits lower initial preload and therefore accommodates a narrow face width configuration. The narrow face width configuration, in turn, avoids potential thermal distortion problems.

In the preferred form, the relationship of the component parts results in a cartridge configuration. This embodiment utilizes a sleeve and retainer, each associated respectively with one of the seal rings. The metal diaphragm forms one closure wall of the cartridge. The entire seal assembly is essentially defined by the axial extent of the metal body of the primary ring retainer with the seal rings contained between a wall of the retainer and the metal diaphragm.

SUMMARY OF THE INVENTION

Accordingly, this invention provides for a mechanical end face seal for sealing between a housing and a relatively rotating shaft which seal includes a pair of relatively rotating annular rings having seal faces in sealing contact with each other to define a seal interface, with one of the rings adapted to be secured to said shaft for rotation therewith, and the other fixed relative to the housing with one being axially movable toward the other.

A generally annular metal diaphragm is secured between an associated, axially movable ring, and either the housing or shaft in a configuration such that it is placed in tension to achieve a preload or initial closing force upon the seal faces.

The diaphragm includes a generally radial disc-like central portion which defines a plurality of annular convolutions. This configuration provides the diaphragm with the necessary load deflection response capability.

In one form of the invention, the seal components are unitized into a single assembly. A retainer is adapted to be disposed in a bore of the housing in surrounding relation to the shaft. The retainer defines an outboard end and an inboard end. The seal rings are disposed intermediate the outboard end and the inboard end of retainer. The generally annular flexible metallic diaphragm is secured to the inboard end of the retainer and to its associated seal ring in fluid-tight relation. The diaphragm defines one closure wall of the assembly to capture the ring components within the retainer. As installed, the diaphragm is deformed in the inboard direction to place the diaphragm in tension to provide an axial preload on the seal faces. The diaphragm is inboard of the seal faces such that the pressure of the fluid to be sealed complements the preload of the diaphragm during operation of the device being sealed.

BRIEF SUMMARY OF THE DRAWINGS

FIG. 1 is a cross-sectional view of a seal assembly employing a metal diaphragm and embodying the principles of the resent invention.

FIG. 1(A) is a cross-sectional view of a diaphragm for the seal assembly depicted in FIG. 1 and embodying the present invention.

FIG. 2 is a cross-sectional view of an embodiment of a seal assembly according to the present invention illustrating certain components in modified form.

FIG. 2(A) is a cross-sectional view of a diaphragm for the seal assembly depicted in FIG. 2 and embodying the principles of the present invention.

FIG. 3 is a cross-sectional view of an alternate embodiment of a seal assembly according to the present invention.

FIG. 4 is a cross-sectional view of a diaphragm for the seal assembly depicted in FIG. 3.

FIG. 5 is a fragmentary cross-sectional view on an enlarged scale of components of the embodiments shown in FIGS. 1, 2 and 3 during an assembly stage.

FIG. 6 is a fragmentary sectional view on an enlarged scale of a modified form of that portion of the apparatus shown in FIG. 5.

FIG. 10 is a sectional view of a modified component for a seal assembly such as illustrated in FIGS. 1, 2, 3 and 8.

FIG. 11 is a sectional view of a further modified form of the component illustrated in FIG. 10.

FIG. 12 is a sectional view of a further modified form of seal assembly embodying the present invention.

FIG. 13 is a sectional view of a further modified form of seal assembly embodying the present invention.

FIG. 14 illustrates a further modified form of a seal embodying the principles of the present invention.

DETAILED DESCRIPTION OF THE ILLUSTRATED EMBODIMENTS

Figure 7:
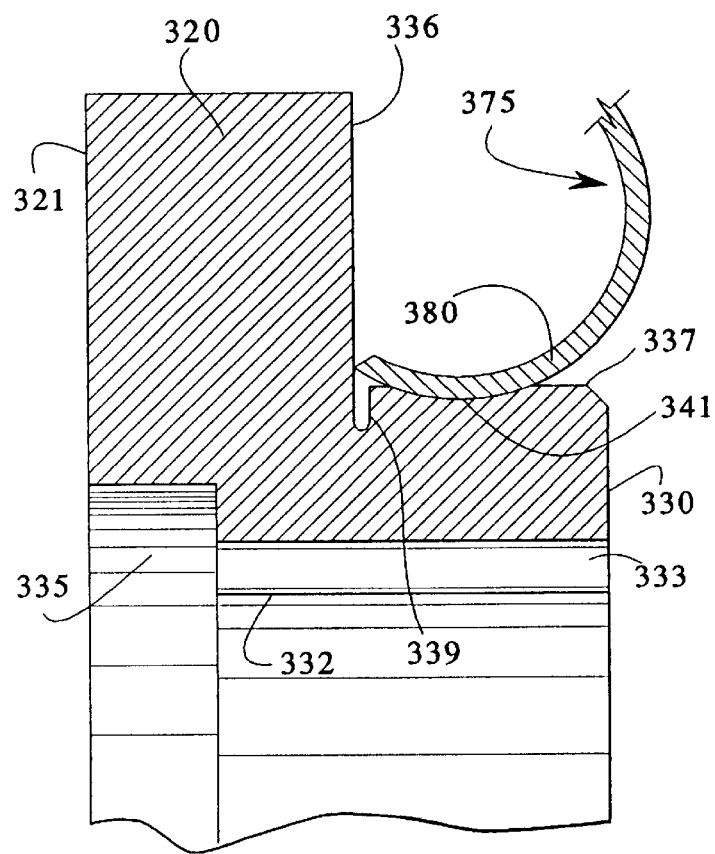
FIG. 7 is a fragmentary sectional view, on an enlarged scale, of a modified arrangement for a portion of the apparatus of FIG. 3.

FIG. 1 illustrates a seal assembly embodying the principles of the present invention. Seal assembly 10 is installed between a housing 12 having a bore or passage 14 through which a relatively rotating shaft 16 extends. The seal assembly provides a fluid-tight seal between the housing and the relatively rotating shaft.

The housing 12 may be a pump, compressor, mixer or other device in which a shaft extends through a surrounding housing. The housing of this illustrated embodiment is a pump, such as a water or other liquid pump, in which an impeller rotatable by the shaft elevates the pressure of the liquid to be sealed. It is contemplated, however, that the seal assembly 10 could have application in installations where a gas such as the atmosphere is present on both sides of the seal and the pressure is not elevated during operation. Examples of such installations include dry mixing vessels and bearing protectors.

In describing the illustrated embodiments, the term "inboard" is used to make reference to the pressure side of the pump and the term "outboard" is used to refer to the ambient conditions external to the pump, i.e., the atmosphere. In a non-pressurized application, "inboard" would refer to a position most near the bearing or other component to be protected by the seal assembly.

Though shown in cross-section, it should be readily apparent that the seal assembly components are annular, as are the various surfaces of these components which are described in detail.

Each seal assembly includes a pair of annular sealing rings illustrated in FIG. 1 mating ring 18 and primary ring 20 associated respectively with shaft 16 and housing 12. These rings respectively define mating sealing faces 19 and 21 which are in facing, sealing relation and define a seal interface.

The ring elements 18 and 20 are shown as contained in carriers comprising a cylindrical sleeve 40 and an annular shell or retainer 70. In this embodiment these latter elements are configured to form a cartridge or unitary seal assembly which may be installed into position as a unitary component. It should be understood, however, that in the most broad aspect of the invention, the seal assembly need not be unitized. Moreover, it is not necessary to every aspect of the invention that a sleeve and retainer be incorporated in the seal assembly.

Referring to FIG. 1, mating ring 18 includes an annular radial surface 22 spaced axially outboard from radial sealing face 19. It also includes a radially inner cylindrical surface 24 having a larger diameter than the diameter of cylindrical sleeve 40 and a radially outer cylindrical surface 26. The outer cylindrical surface 26 is provided with drive notches 28 equally spaced about its periphery.

Primary ring 20 includes inboard radial surface 30 spaced inboard of seal face 21. Ring 20 also includes an inner axial cylindrical surface 32 having a diameter larger than the cylindrical body of sleeve 40. Primary ring 20 includes inboard annular shoulder defined by radial surface 36 and axially extending cylindrical surface 37 joined by filet 38.

The inner axial cylindrical surface 32 includes axially extending slots 33 extending from its inboard end to an annular relief 35 which defines the inner diameter of face 21. Slots 33 provide a path for the fluid to be sealed to communicate with the interface between relatively rotating sliding seal faces 19 and 21 to provide cooling at the inside diameter of the ring interface.

Referring to FIG. 1, shaft sleeve 40 supports mating ring 18 upon the shaft 16. Shaft sleeve 40 includes a tubular elongate portion 50. Tubular elongate portion 50 is formed to define outboard large diameter portions 54 and inboard shaft engaging portions 56 having an inboard end 52. Larger diameter outboard portion 54 is sized to freely receive an end of the shaft 16 on installation. Shaft engaging portion 56 of shaft sleeve 40 is sized to frictionally engage the shaft 16 to retain the sleeve 40 and ring 18 in operative position on the shaft for rotation with the shaft.

Sleeve 40 defines ring seal ring receptacle comprising flange 46 which is radial and an annular cup-shaped portion defining cylindrical wall 48. Wall 48 has an inner cylindrical surface overlying outer cylindrical surface 26 of ring 18. Ring 18 is supported in fluid-tight engagement within the seal ring receptacle with radial wall 22 in contact with radial flange 46.

An elastomeric support member 60 is disposed between ring 18 and flange 46 and large cylindrical portion 54 of retainer 40. This member provides a resilient seat for ring 18 and acts as a fluid-tight secondary seal. It also transfers torsional loads between sleeve 40 and ring 18. Drive detents 58 in the cylindrical wall 48 engage notches 28 in mating ring 18 to further transfer torsional loads to the sleeve 40.

The mating ring 18 may alternatively be press fit within the receptacle portion formed by radial flange 46 and cylindrical wall 48. An interference fit between outer cylindrical surface 26 of ring 18 and inner cylindrical surface of wall 48 of the receptacle has been found sufficient to maintain a fluid-tight contact with the mating ring 18 and to prevent relative motion between these elements. Such an arrangement is discussed further in connection with the embodiment illustrated in FIG. 2.

In the embodiment of FIG. 1 the primary ring 20 is supported relative to housing 12 by annular stamped metal primary ring retainer 70. The retainer 70 comprises an axially extending central body portion 72, a radially extending annular outboard radial wall 71 at its outboard end and an annular rim 74 extending radially outwardly from the inboard end of central body portion 72. Radial wall 71 defines a central aperture smaller than the outer diameter of flange portion 46 of sleeve 40 or outer cylindrical surface 26 of ring 18.

The axially extending central body portion 72 has a predetermined diameter which is received in the bore 14 of housing 12. The housing bore 14 is sized such that the central portion 72 may be press fit into the bore to create a fluid-tight relationship between the retainer 70 and the housing 12. The annular rim 74 includes an outboard facing surface 77 which seats against the interior or inboard surface of the wall of the housing 14 to provide a stop to precisely position the retainer 70 relative to the housing 12 and shaft 16.

In accordance with the principles of the present invention, primary ring 20 is supported in primary ring retainer 70 by a resilient metal diaphragm 75. Diaphragm 75 is generally annular in shape and extends generally radially. It is connected at its circumferential radially inner end portion to primary ring 20 and at its circumferential radially outer end portion to primary ring retainer 70. These connections are fluid-tight to prevent leakage of the process fluid from the housing 12. These connections are potential secondary leakage paths and the fluid-tight relationship between the components comprise secondary seals. Similarly, in this embodiment the elastic support member 60 interposed between mating ring 18 and sleeve 40 closes the potential secondary leakage path between these components and performs a secondary seal function.

Referring to FIG. 1(A), the circumferential inner end portion of diaphragm 75 is defined by inner, axially extending conical flange portion 80 converging axially in the inboard direction and terminating in an inboard edge 81. The diaphragm 75 includes a generally radial disc-like central portion 84 having inboard surface 85 and an outboard surface 86. The diaphragm circumferential outer end portion is defined by a radially directed outer rim portion 88.

Diaphragm radial disc-like central portion 84 is provided with a plurality of radially spaced annular convolutions 76. In the embodiment illustrated in FIGS. 1 and 1(A), the diaphragm central portion 84 includes three annular protrusions in the inboard direction integrally joined by annular protrusions in the outboard direction. The radial outermost inboard protrusion is formed on a radius R-1. The remaining inboard protrusions and intermediate outboard protrusions are each formed on radius R-2. These radii meet at tangent points to form smoothly curved convolutions of surfaces 85 and 86 of central portion 84 of diaphragm 75.

A curved transition portion 87, formed on a radius slightly larger than the radius of filet 38 on primary ring 20 forms innermost outboard protrusion and joins radial innermost inboard protrusion with inner axially extending conical flange portion 80. A further curved transition portion 89 also on a slightly larger radius joins radially outermost inboard protrusion with radially directed outer rim 88.

In the embodiment of FIGS. 1 and 1(A) radius R-1 is somewhat larger than radii R-2. Also, the central portion 84 with convolutions 76 is displaced slightly in the outboard direction from transition portion 89 toward transition portion 87.

Primary ring 20 is secured to diaphragm 75 at axial flange portion 80. The flange portion 80 is received upon cylindrical surface 37 of the primary ring. The ring and diaphragm are connected by an interference fit between inboard directed flange 80 and the cylindrical surface 37. The transition portion 89 abuts the radial surface 36. The radius of the transition portion 87 is slightly larger than the radius of the filet 38 to insure tangential contact against both the cylindrical surface 37 and radial surface 36.

It is necessary that connection of diaphragm 75 and ring 20 be fluid-tight and also sufficiently strong to resist torsional loads which are imparted from the sliding movement between face 21 and mating face 19 of mating ring 18. To insure the fluid-tight interference fit, the inner diameter of flange 80 is smaller than the outer diameter of cylindrical surface 37 of the shoulder formed on primary ring 20. When these parts are interengaged, flange 80 deforms to accept surface 37. It is contemplated that, on assembly, the resilient nature of the diaphragm causes conical portion 80 to effectively resist withdrawal of the cylindrical surface 37, thus insuring a secure and fluid-tight connection which is sufficiently strong to resist torsional forces imparted between the relatively rotating sealing rings.

A sealant or coating may be used to further protect against leakage and aid in resisting relative torsional movement between flange 80 and surface 37 of seal ring 20. A material considered suitable is LOCTITE, an adhesive sold by the Lockite Company, Chicago, Ill.

Diaphragm 75 is connected to primary ring retainer 70 by welding. A fluid-tight welded joint exists between the rim 74 of the retainer 70 and outer radial rim portion 88 of diaphragm 75. It may be accomplished by projection welding, laser welding, seam welding or any other suitable method.

In this embodiment, projection welding is employed to connect rim portion 88 of diaphragm 75 to rim 74 of retainer 70. As illustrated particularly in FIG. 5, to achieve a projection welded connection, rim 74 of retainer 70 is formed with an annular projection 73. Such a projection could, for example, be machined onto the radial surface of rim 74. Rim 88 portion of diaphragm 75 is positioned in overlying contact with projection 73. Appropriate welding electrodes contact the respective parts and upon passage of current cause projection 73 to fuse to diaphragm rim 88 to form a fluid-tight connection.

FIG. 6 illustrates an alternative manner for formation of an annular weld projection. In this embodiment, the annular projection 173 is formed into a retainer rim 74 of uniform thickness. Such configuration can be achieved, for example, with an annular punch or die which impacts the outboard surface 77 of rim 74 to cause a protrusion in the inboard direction as illustrated. On welding the projection 73 will fuse the rim 74 to the rim portion 88 of diaphragm 75.

The materials contemplated for use in the seal assembly of the present invention are those generally used in such devices. Primary ring 20 may be made of carbon graphite, phenolic, bronze, PTFE impregnated bronze, or silicon carbide. Mating ring 18 may be a ceramic such as alumina or silicon carbide. Alternatively, steam treated sintered iron may be used. Silicon carbide and tungsten carbide may also be used as the ring material. Any other suitable hard-on-hard or hard-on-soft ring combination is within the scope contemplated for the invention. Retainer 70 and sleeve 40 may be metal stampings formed of stainless steel.

It is contemplated the diaphragm 75 is suitably made as a stamping or roll formed part from stainless steel or any other suitable material. It has been found that ASTM stainless steel AM-350 or AM-316L is suitable for use in the diaphragm 75. It is expected that the thickness could range from 0.002 to 0.010 inches, or thicker, depending on shaft diameter seal size and particular material used.

When deflected and placed in tension, the diaphragm possesses the requisite resiliency to impart the axial closing force upon the axially movable primary ring 20 to urge it into sealing engagement with mating ring 18. Its disc-like shape, and convolutions, and its loading in tension assure a spring rate which is sufficiently linear throughout the expected operating range of deflection to properly load the seal faces. It is contemplated that deflection could vary 0.035 to 0.050 inches or more through tolerance stack-up, shaft movement and the like. A minimum face preload is required to maintain a sufficient closing force at minimum diaphragm deflection. The configuration of the diaphragm of the present invention provides a load deflection relationship which is effective throughout the range of possible deflection.

The diaphragm 75 is positioned such that generally radial disc-like central portion 84 closes off the inboard end of retainer body 70 at about the axial position of rim or flange 74. Thus, seal rings 18 and 20 are disposed within the confines of the retainer 70 between radial outboard wall 71 and diaphragm 75 connected to flange 74 at the inboard end.

Seal assembly 10 is assembled by disposing mating ring sleeve 40 with attached mating ring 18 within central axial body portion 72 of retainer 70. It is positioned with seal face 19 facing toward the inboard end of retainer body portion 72 and with mating ring retainer flange 46 in contact with radial wall 71 which captures it within the retainer body portion. Diaphragm 75 with primary ring 20 attached is then positioned at the inboard end of retainer body portion 72 with seal face 21 in contact with seal face 19 to form the seal interface between surfaces 19 and 21. The diaphragm 75 is then secured to retainer 70 by welding of rim 74 to rim portion 88 to complete the assembly with seal rings 18 and 20 captured between radial outboard wall 71 and diaphragm 75.

During assembly, with the diaphragm in its free state illustrated in FIG. 1(A) the length of central axial portion 72 of retainer 70 is such that when faces 19 and 21 are in contact and ring retainer flange 46 in contact with radial wall 71 rim portion 88 of the diaphragm 75 is spaced from rim 74 of retainer 70. Appropriate welding electrodes engage the rim portions 88 and 74 to bring them into contact for welding. This action causes resilient deflection of the diaphragm 75 to place it in tension and imparts an initial load onto the ring 20 urging it toward ring 18. Referring to FIG. 1(A), in relative terms, tension loading of the diaphragm 75 results from deflection of the generally radial disc-like central portion 84 of the diaphragm such that the radially innermost, outboard protrusion, is moved in the inboard direction relative to its free state, increasing the axial distance between the circumferential portion of the diaphragm connected to the housing retainer rim 74 and the circumferential portion of the diaphragm 75 connected to cylindrical surface 37 of ring 20.

In the assembled condition of seal assembly 10, as depicted in FIG. 1, the faces 19 and 21 are in contact and radial ring retainer flange 46 is in contact with radial wall 71 of retainer 70. The diaphragm 75 is deflected in tension to maintain an initial load on the seal faces. The interface created between faces 19 and 21 is thereby protected against entry of foreign matter.

An example of an application for which the diaphragm seal of the present invention is particularly suited is an automotive water pump. It is contemplated, however, that it is also suitable for a wide range of liquid systems as well as other systems because the seal can be readily and efficiently produced in high volume. Another use contemplated is air conditioning and refrigeration refrigerant compression. The metal diaphragm would eliminate the need to match conventional elastomeric or polymeric bellows commonly used in refrigeration equipment seals to the particular refrigerant used.

As illustrated, seal assembly 10 is unitized. That is, the sleeve 40 and its associated mating ring 18 are captured within shell or retainer 70 between annular outboard radial wall 71 and diaphragm 75 and its associated primary ring. The assembly is inserted into the pump over a free end, not shown, of the shaft 16, which, in the instance of the illustrated embodiment, is inboard of the pump. Usually, a portion of the pump housing and the pump impeller are removed for access to the shaft end.

Seal assembly 10 is slid onto the shaft free end. This initial placement is eased by large diameter portion 54 of sleeve 40. Shaft engaging portion 56 of sleeve 40 is sized to fit tightly upon shaft 16 to fix the sleeve to the shaft. A certain minimum axial force is necessary to move the seal assembly to its installed position. Usually a tool is provided which applies such force to the inboard end 52 of shaft engaging portion 56. The tool also applies axial force to inboard surface of rim 88 of diaphragm 75 to apply axial force on rim 74 of retainer 70. The seal assembly is moved axially of shaft 16 and retainer central body portion 72 enters the bore 14 in housing 10. The central portion 72 is sized to be press fit into the bore to provide a fluid-tight relation. Again, a sealant may be used to ensure a fluid-tight relationship.

The tool is arranged such that axial movement of the sleeve 40 terminates prior to contact of surface 77 of rim 74 of retainer 70 with the wall of the housing 16. Movement of retainer 70 continues until surface 77 of rim 74 contacts the inboard surface of housing 12. The resultant relative axial movement of the retainer 70 and primary ring 20 to the sleeve 40 and mating ring 18 causes further deflection of the diaphragm 75 to further place it in tension, as previously discussed, between its connection to the rim 74 of central body portion 72 of retainer 70 and its connection to primary ring 20.

During installation, radial wall 71 moves away from ring retainer flange 46 to assume the relationship illustrated in FIG. 1. Generally radial disc-like central portion 84 of diaphragm 75 is resiliently deflected such that the radially innermost end of the diaphragm moves in the inboard direction relative to its free state to place the diaphragm in further tension. This increase in deflection increases the restoring force of the deflected diaphragm and results in application of the requisite axial preload on primary ring 20 urging face 21 into sealing relation with face 19 of mating ring 18.

When the seal assembly 10 is installed the diaphragm 75 is inboard of seal rings 18 and 20. Inboard radial surface 85 of diaphragm 75 is exposed to the fluid to be sealed, which, when pump shaft 16 is rotating, is under pressure. It should be noted that inboard radial surface 30 is similarly affected by the process fluid pressure. The closing force upon the seal interface is the sum of the force of the tension load on the diaphragm and the force created by fluid pressure acting on the inboard surface 85 of diaphragm 75 and radial surface 30 of ring 20.

It should be understood that the present invention is equally applicable to a seal assembly configuration which is not unitized. It is merely necessary to eliminate the outboard radial wall 71 of retainer 70 to provide a seal assembly of two separate components, the sleeve 40 and its ring 18 and the retainer 70 and its ring 20 and diaphragm 75. In this form it is contemplated that retainer 75 could be made from tubing rather than stamped from flat sheet.

FIG. 2 illustrates a further seal assembly embodying the principles of the present invention. Seal assembly 210 is installed between a housing 212 having a bore or passage 214 through which a relatively rotating shaft 216 extends. The seal assembly provides a fluid-tight seal between the housing and the relatively rotating shaft.

Each seal assembly includes a pair of annular sealing rings illustrated in FIG. 2 as mating ring 218 and primary ring 220 associated respectively with shaft 216 and housing 212. These rings respectively define mating sealing faces 219 and 221 which are in facing, sealing relation and define a seal interface.

The ring elements 218 and 220 are shown as contained in a cylindrical sleeve 240 and an annular shell or retainer 270. In this embodiment these latter elements are configured to form a cartridge or unitary seal assembly which may be installed into position as a unitary component. It should be understood, however, in the most broad aspect of the invention, the seal assembly need not be unitized.

Mating ring 218 includes an annular radial surface 222 spaced axially outboard from radial sealing face 219. It also includes a radially inner cylindrical surface 224 having a larger diameter than the diameter of cylindrical sleeve 240 and a radially outer cylindrical surface 226. The ring 218 is provided with a conical chamfer 227 between outboard radial surface 222 and radially outer cylindrical surface 226.

Primary ring 220 includes inboard radial surface 230 spaced inboard of seal face 221. Ring 220 also includes an inner axial cylindrical surface 232 having a diameter larger than the cylindrical body of sleeve 240. Primary ring 220 includes inboard annular shoulder defined by radial surface 236 and axially extending cylindrical surface 237 joined by filet 238.

Referring to FIG. 2, shaft sleeve 240 supports mating ring 218 upon the shaft 216. Shaft sleeve 240 includes a tubular elongate portion 250. Tubular elongate portion 250 is formed to define outboard large diameter portion 254 and inboard shaft engaging portion 256, which is provided with slightly flared inboard end 252. Larger diameter outboard portion 254 is sized to freely receive an end of the shaft 216 on installation. Shaft engaging portion 256 of shaft sleeve 240 is sized to frictionally engage the shaft 216 to retain the sleeve 240 and ring 218 in operative position on the shaft for rotation with the shaft. Flared end 252 is provided to cooperate with an installation tool as will be explained.

Sleeve 240 defines seal ring receptacle comprising flange 246 which is radial and an annular cup-shaped portion defining axial cylindrical wall 248. Wall 248 has an inner cylindrical surface overlying outer cylindrical surface 226 of ring 218. Ring 218 is supported in fluid-tight engagement within the seal ring receptacle with radial wall 222 in contact with radial flange 246.

The mating ring 218 is press fit within the receptacle portion formed by radial flange 246 and cylindrical wall 248. An interference fit between outer cylindrical surface 226 of ring 218 and inner cylindrical surface of wall 248 of the receptacle has been found sufficient to maintain a fluid-tight contact with the mating ring 218 and to prevent relative motion between these elements. The interference fit is between 0.002 inches and 0.005 inches on the diameter of surface 226. The wall 248 of sleeve 240 is about 0.015 to 0.020 inches in thickness.

In this embodiment, a sealant or coating is used to further protect against leakage and aid in resisting relative torsional movement between wall 248 and surface 226 of seal ring 218. The coating previously described, LOCTITE, the adhesive sold by the Loctite Company, Chicago, Ill. is suitable.

In the embodiment of FIG. 2 the primary ring 220 is supported relative to housing 212 by annular stamped metal primary ring retainer 270. The retainer 270 comprises an axially extending central body portion 272, a radially extending annular outboard radial wall 271 at its outboard end and an annular rim 274 extending radially outwardly from the inboard end of central body portion 272. Radial wall 271 defines a central aperture smaller than the outer peripheral diameter of flange portion 246 of sleeve 240 or of cylindrical surface 226 of ring 218. Rim 274 includes an axially extending cylindrical portion 269.

The axially extending central body portion 272 has a predetermined diameter which is received in the bore 214 of housing 212. The housing bore 214 is sized such that the central portion 272 may be press fit into the bore to create a fluid-tight relationship between the retainer 270 and the housing 212. The annular rim 274 includes an outboard facing surface 277 which seats against the interior or inboard surface of the wall of the housing 214 to provide a stop to precisely position the retainer 270 relative to the housing 212 and shaft 216.

In accordance with the principles of the present invention, primary ring 220 is supported in primary ring retainer 270 by a resilient metal diaphragm 275. Diaphragm 275 is generally annular in shape and extends generally radially. It is connected at its circumferential radially inner end portion to primary ring 220 and at its circumferential radially outer end portion to primary ring retainer 270. These connections are fluid-tight to prevent leakage of the process fluid from the housing 212.

Referring to FIG. 2(A), the circumferential inner end portion of diaphragm 275 is defined by inner, axially extending frusto-conical flange portion 280 converging axially in the inboard direction and terminating in an inboard edge 281. The diaphragm 275 includes a generally radial disc-like central portion 284 having inboard surface 285 and an outboard surface 286. The diaphragm circumferential outer end portion is defined by a radially outer rim portion 288.

The outer diameter of peripheral rim 288 is slightly smaller than the inner diameter of axially extending cylindrical portion 269 of rim 274 of retainer 270. The disposition of rim 284 within the axially extending cylindrical portion 269 aids in the assembly process. The axial portion 269 is, however, an optional feature dictated by manufacturing considerations and does not alter function of the diaphragm of an operating seal assembly.

Best seen in FIG. 2(A), diaphragm radial disc-like central portion is formed with a plurality of radially spaced annular convolutions 276. In the embodiment illustrated in FIGS. 2 and 2(A), the diaphragm central portion 284 includes three annular protrusions in the inboard direction integrally joined by annular protrusions in the outboard direction. The radial outermost inboard protrusion is formed on a radius R-1. The remaining inboard protrusions and intermediate outboard protrusions are each formed on radius R-2. These radii meet at tangent points to form a smoothly curved convolution of surfaces 285 and 286 of central portion 284 of diaphragm 275.

A curved transition portion 287, formed on a radius slightly larger than the radius of filet 238 on primary ring 220, forms innermost outboard protrusion and joins radial innermost inboard protrusion with inner axially extending conical flange portion 280. A further curved transition portion 289 also on a slightly larger radius joins radially outermost inboard protrusion with radially directed outer rim 288.

In the embodiment of FIGS. 2 and 2(A) radius R-1 is somewhat smaller than radii R-2. The central portion 284 with convolutions 276 is displaced slightly in the outboard direction from transition portion 289 to transition portion 287. It should be appreciated, however, that the number size of radius, and relationship between size of radius defining the convolutions may be varied to develop the desired load deflection relationship for a particular application of the seal assembly 210.

Primary ring 220 is secured to diaphragm 275 at axial flange portion 280. The flange portion 280 is received upon cylindrical surface 237 of the primary ring. The ring and diaphragm are connected by an interference fit between inboard directed flange 280 and the cylindrical surface 237. The transition portion 287 abuts the radial surface 236. The radius of the transition portion 287 is slightly larger than the radius of the filet 238 to insure tangential contact against both the cylindrical surface 237 and radial surface 236.

It is necessary that connection of diaphragm 275 and ring 220 be fluid-tight and also sufficiently strong to resist torsional loads which are imparted from the sliding movement between face 221 and mating face 219 of mating ring 218. To insure the fluid-tight interference fit, the inner diameter of flange 280 is smaller than the outer diameter of cylindrical surface 237 of the shoulder formed on primary ring 220. When these parts are interengaged, flange 280 deforms to accept surface 237.

The outer diameter of cylindrical surface 237 of the shoulder formed on primary ring 220 is sized to insure an interference fit with frusto conical portion 280 of diaphragm 275. This interference fit is about 0.002 inches at the axial location along conical portion 280 which is tangent to cylindrical surface 237 of primary ring 220. It is contemplated that, on assembly, the resilient nature of the diaphragm causes conical portion 280 to effectively resist withdrawal of the cylindrical surface 237, thus insuring a secure and fluid-tight connection which is sufficiently strong to resist torsional forces imparted between the relatively rotating sealing rings.

A sealant or coating may be used to further protect against leakage and aid in resisting relative torsional movement between diaphragm 275 and seal ring 220. The coating or adhesive sold under the trademark LOCTITE, by the Loctite Company, Chicago, Ill. is suitable.

Diaphragm 275 is connected to primary ring retainer 270 by welding. A fluid-tight welded joint exists between the rim 274 of the retainer 270 and outer radial rim portion 288 of diaphragm 275. It may be accomplished by projection welding, laser welding, seam welding or any other suitable method.

In this embodiment, as in the embodiment of FIG. 1, projection welding is employed to connect the rim portion 288 of diaphragm 275 to rim 274 of retainer 270. Such a projection could, for example, be machined onto the radial surface of rim 274. During assembly, rim portion 288 of diaphragm 275 is positioned in overlying contact with the projection. Appropriate welding electrodes contact the respective parts and upon passage of current cause the projection to fuse to diaphragm rim portion 288.

The materials of seal assembly 210 of the illustrated embodiment are similar to those used in the embodiment of FIG. 1. The rings 218 and 220 may be made in any combination previously described. Retainer 270 and sleeve 240 may be metal stampings formed of stainless steel.

As in the embodiment of FIGS. 1 and 1(A), it is contemplated the diaphragm 275 be suitably made as a stamping or roll formed part from stainless steel. It has been found that ASTM stainless steel AM-350 or AM-316L is suitable for use in the diaphragm 75. AM-310 is also a suitable stainless steel material for the diaphragm of the seals illustrated by the various embodiments shown. It is expected that the thickness of the diaphragm could range from 0.002 to 0.010 inches, or thicker, depending on shaft diameter and seal size.

When deflected and placed in tension, the diaphragm possesses the requisite resiliency to impart the axial closing force upon the axially movable primary ring 220 to urge it into sealing engagement with mating ring 218. Its disc-like shape, and convolutions, and its loading in tension assure a spring rate which is sufficiently linear throughout the expected operating range of deflection to properly load the seal faces.

The diaphragm 275 is positioned such that generally radial central portion 284 closes off the inboard end of retainer body 270 at about the axial position of rim or flange 274. Thus, seal rings 218 and 220 are disposed within the confines of the retainer 270 between radial outboard wall 271 and diaphragm 275 connected to flange 274 at the inboard end.

Seal assembly 210 is assembled as described in connection with the embodiment of FIGS. 1 and 1(A). Mating ring sleeve 240 with attached mating ring 218 is positioned within central body portion 272 of retainer 270. It is positioned with seal face 219 facing toward the inboard end of retainer body portion 272 and with mating ring retainer flange 246 in contact with radial wall 271 which captures it within the retainer body portion. Diaphragm 275 with primary ring 220 attached is then positioned at the inboard end of retainer body portion 272 with seal face 221 in contact with seal face 219 to form the seal interface between surfaces 219 and 221. The diaphragm 275 is then secured to retainer 270 by welding of rim 274 to rim portion 288 to complete the assembly with seal rings 218 and 220 captured between radial outboard wall 271 and diaphragm 275.

During assembly, with the diaphragm in its free state illustrated in FIG. 2(A) the length of central axial portion 272 of retainer 270 is such that when faces 219 and 221 are in contact and ring retainer flange 246 in contact with radial wall 271, rim portion 288 of the diaphragm 275 is spaced from rim 274 of retainer 270. Appropriate welding electrodes engage the rim portions 288 and 274 to bring them into contact for welding. This action causes deflection of the diaphragm 275 to place it in tension and imparts an initial load onto the ring 220 urging it toward ring 218. Referring to FIG. 2(A), in relative terms, tension loading of the diaphragm 275 results from deflection of the generally radial disc-like central portion 284 of the diaphragm such that the radially innermost, outboard projection, is moved in the inboard direction relative to its free state increasing the axial distance between the circumferential portion of the diaphragm connected to the housing retainer rim 274 and the circumferential portion of the diaphragm 275 connected to the cylindrical surface 237 of ring 220.

In the assembled condition of seal assembly 210 the faces 219 and 221 are in contact and radial rim retainer flange 246 is in contact with radial wall 271 of retainer 270. The diaphragm 275 is deflected in tension to maintain an initial load on the seal faces. The interface created between faces 219 and 221 is thereby protected against entry of foreign matter.

As illustrated, seal assembly of FIGS. 2 and 2(A), 210 is unitized. That is, the sleeve 240 and its associated mating ring 218 are captured within shell or retainer 270 between annular outboard radial wall 271 and diaphragm 275 and its associated primary ring. The seal assembly, of course, need not be unitized. It is only necessary to eliminate outboard radial wall 271 of retainer 270 to provide a seal assembly of two separate components. The assembly is inserted into the pump over a free end, not shown, of the shaft 216, which, in the instance of the illustrated embodiment, is inboard of the pump. Usually, a portion of the pump housing and the pump impeller are removed for access to the shaft end.

Seal assembly 210 is slid onto the shaft free end. This initial placement is eased by large diameter portion 254 of sleeve 240. Shaft engaging portion 256 of sleeve 240 is sized to fit tightly upon shaft 216 to fix the sleeve to the shaft. A certain minimum axial force is necessary to move the seal assembly to its installed position. Usually a tool is provided which applies such force to the inboard end 252 of shaft engaging portion 256. The tool also applies axial force to inboard surface of rim 288 of diaphragm 275 to apply axial force on rim 274 of retainer 270. The seal assembly is moved axially of shaft 216 and retainer central body portion 272 enters the bore 214 in housing 210. The central portion 272 is sized to be press fit into the bore to provide a fluid-tight relation. Sealant may be used to ensure a fluid-tight connection. An example of a suitable sealant is sold under the trademark LOCTITE by the Loctite Company, Chicago, Ill.

The tool is arranged such that axial movement of the sleeve 240 terminates prior to contact of surface 277 of rim 274 of retainer 270 with the wall of the housing 216. Movement of retainer 270 continues until surface 277 of rim 274 contacts the inboard surface of housing 212. The resultant relative axial movement of the retainer 270 and primary ring 220 to the sleeve 240 and mating ring 218 causes further deflection of the diaphragm 275 to place it in further tension, as previously discussed, between its connection to the rim 274 of central body portion 272 of retainer 270 and its connection to primary ring 220.

During installation, radial wall 271 moves away from ring retainer flange 246 to assume the relationship illustrated in FIG. 2. Generally radial disc-like central portion 284 of diaphragm 275 is resiliently deflected such that the radially innermost end of the diaphragm moves in the inboard direction relative to its free state to place the diaphragm in further tension. This increase in deflection increases the restoring force of the deflected diaphragm and results in the application of the requisite axial preload on primary ring 220 urging face 221 into sealing relation with face 219 of mating ring 218.

When the seal assembly 210 is installed the diaphragm 275 is inboard of seal rings 218 and 220. Inboard radial surface 285 is exposed to the fluid to be sealed, which, when pump shaft 216 is rotating, is under pressure. The closing forces upon the seal interface are the sum of the force of the tension load on the diaphragm and the force created by fluid pressure acting on the inboard surface 285 of diaphragm 275 and radial surface 230 of ring 220.

In the embodiment of FIGS. 2 and 2(A), mating ring 218 is formed of silicon carbide. The ring is sufficiently strong to be employed in the illustrated interference or press fit configuration for attachment of the ring 218 to sleeve 240 without experiencing undesirable mechanical distortion. Such distortion, if present, could be transformed to face 219 and result in undesirable wear or failure through leakage at the seal interface.

An example of a seal assembly in the form illustrated in FIG. 2 has been constructed for a water pump having a shaft 0.625 inch in diameter. The pump pressure develops to about 20 psi and could under certain conditions exceed 50 psi.

The retainer 270 has an outer diameter of 1.440 inches at the cylindrical central body portion 272. It is pressed into a bore 214 which is slightly under 1.440 inches in diameter. The inner diameter of cylindrical portion 269 of flange 274 is 1.633 inches. The retainer has an axial length from surface 277 of rim 274 to the outboard surface of radial wall 271 of 0.338 inches.

Diaphragm 275 is made of AM-350 stainless steel. It is 0.003 inch thick. The outer diameter of rim 288 is 1.628 inches. The inner diameter of frusto-conical portion 280 at inboard end 281 is 0.851 inches. The angle of the conical portion 280 is 10° to a line parallel to the central axis of diaphragm 275.

Radial outermost inboard protrusion is formed on a radius R-1 which is 0.024 inches. The radius R-2 of the two additional inboard protrusions and joining outboard protrusions is 0.030 inch. The transition portion 287 which forms the radially innermost outboard protrusion and the transition portion 289 which joins the radially outermost protrusion with rim 288 are formed on a 0.035 inch radius.

The distance between the outboard surface of rim portion 288 and the inboard surface 285 of the radially outermost inboard protrusion is 0.024 inch. The displaced configuration of the generally radial disc-like central portion 284 places the inboard surface 285 of the radially innermost inboard protrusion 0.004 inch outboard of the surface 285 of the radially outermost inboard protrusion. The outboard surface 286 of the outboard protrusions is disposed outboard of the outboard surface of rim 288 approximately the same amount. The distance measured along the central axis of the diaphragm 275 from surface 286 of the radial innermost outboard protrusion to the inboard end 281 of frusto-conical portion 280 is 0.084 inch. The length of the frusto-conical portion 280 from its end 281 to the transition portion 287 is 0.051 inches.

When the seal assembly 210 is installed between housing 212 and shaft 216 as illustrated in FIG. 2 the diaphragm is deflected axially about 0.035 to 0.040 inches from its free state. This deflection places the diaphragm in tension by displacing the innermost outboard protrusion in the inboard direction relative to the rim 288. This deflection creates a restoring force which provides an axial preload on the primary ring 220 of about eight pounds urging it toward mating ring 318. When the pump is activated, the sealed fluid is pressurized to approximately 20 pounds per square inch within housing 214. This pressure, acting on inboard surface 385, and inboard radial face 230, exerts an additional axial load of about twelve pounds urging ring 220 toward ring 218.

FIGS. 3, 4, and 7 through 13 illustrate further examples of seals embodying the principles of the present invention. The seal assemblies illustrated show variations in the configuration of the biasing diaphragm or the manner of securing it to the retainer. Variations of the configuration of the mating ring and sleeve as well as other features of the seal components are illustrated. In each instance, however, a seal is shown which includes a generally radial metallic diaphragm defining a series of convolutions and which is placed in tension to provide an axial preload on the seal ring faces.

The seals include a retainer housing or shell which houses the relatively rotating seal rings. The seal assembly is unitized within the retainer by the diaphragm which, in essence, defines an inboard closure wall. The mating ring and associated sleeve are captured between the diaphragm and its associated primary ring and the outboard wall of the retainer.

Referring now to FIG. 3 there is illustrated a seal assembly illustrative of an alternate arrangement for connection of the diaphragm to the primary seal ring. Seal assembly 310 includes mating ring 318 rotatable with shaft 316 and primary ring 320 fixed relative to housing 312 within bore 314. The mating and primary rings define sealing faces 319 and 321 which define a seal interface to seal against loss of process fluid along shaft 316. Ring 318 may be a ceramic such as alumina. Ring 320 may be made of carbon graphite. As previously discussed with respect to the embodiment of FIG. 1, any suitable ring combination of hard-on-hard or hard-on-soft rings may be used.

Ring elements 318 and 320 are housed respectively in a cylindrical sleeve 340 and annular shell or retainer 370. These latter elements are metal stampings and configured to form a cartridge or unitary seal assembly which is arranged to be installed into position as a unitary component. The sleeve 340 and retainer 370 are made from stainless steel.

Mating ring 318 includes an annular radial surface 322 spaced axially outboard from radial sealing face 319. It also includes a radially inner cylindrical surface 324 having a larger diameter than the diameter of cylindrical sleeve 340 and a radially outer cylindrical surface 326. Surface 326 is provided with a plurality of drive detents 328 spaced about its periphery.

Primary ring 320 includes inboard radial face 330. It further includes radially outer cylindrical surface 334. An inboard annular shoulder is formed in radially outer cylindrical surface which is defined by radial surface 336 and axially extending cylindrical surface 337. Machining relief or undercut 339 permits radial surface 336 to meet cylindrical surface 337 with no connecting radius or filet for reasons as will become apparent.

Ring 320 also includes an inner axial cylindrical surface 332 having a diameter larger than the cylindrical body of sleeve 340. Axially extending slots 333 extend from its inboard end to an annular relief 335 which defines the inner diameter of face 321. Slots 333 provide a path for the fluid to be sealed to communicate with the interface between relatively rotating sliding seal faces 319 and 321 at the inner diameter of the interface.

Referring to FIG. 3, shaft sleeve 340 supports mating ring 318 upon the shaft 316. Shaft sleeve 340 includes a tubular elongate portion 350. Tubular elongate portion 350 is formed to define outboard large diameter portion 354 and inboard shaft engaging portion 356. Larger diameter outboard portion 354 is sized to freely receive an end of the shaft 316 on installation. Shaft engaging portion 356 of shaft sleeve 340 is sized to frictionally engage the shaft 316 to retain the sleeve 340 and ring 318 in operative position on the shaft.

Sleeve 340 defines radial ring retainer flange portion 346 which includes an annular cup-shaped receptacle which receives mating ring 318. As illustrated, an elastomeric support member 360 is disposed between ring 318, retainer flange 346 and large cylindrical portion 354. This support member provides a resilient seat for ring 318 and also acts as a fluid-tight secondary seal. In addition, the elastomeric support member 360 transfers torsional loads from the sleeve 340 to mating ring 318 to drive the rotating ring.

The mating ring 318 may be press fit within the receptacle formed by mating ring retainer flange 346 as illustrated in the embodiment of FIG. 2. An interference fit has been found sufficient to maintain the mating ring 318 to prevent relative motion between these elements. Alternatively, as illustrated in FIG. 3, drive detents 358 engage notches 328 in mating ring 318 to transfer torsional loads to the sleeve 340.

The primary ring 320 is supported relative to housing 312 by annular stamped metal primary ring retainer 370. The retainer 370 is similar to retainer 70 in the embodiment of FIG. 1. It comprises an axially extending central body portion 372, a radially extending wall 371 at its outboard end and an annular rim 374 extending radially outwardly from the inboard end of central body portion 372. Radial wall 371 defines a central aperture smaller than the outer peripheral diameter of flange 346 or ring 318.

The axially extending central body portion 372 has a predetermined diameter which is received in the bore 314 of housing 312. The housing bore 314 is sized such that the central portion 372 may be press fit into the bore to create a fluid-tight relationship between the retainer 370 and the housing 312. The annular rim 374 includes an outboard surface 377 which seats against the interior or inboard surface of the wall of the housing 314 to provide a stop to precisely position the retainer 370 relative to the housing 312 and shaft 316.

In accordance with the principles of the present invention, primary ring 320 is supported in primary ring retainer 370 by a metal diaphragm 375, preferably made of stainless steel. Diaphragm 375 is generally annular in shape. It is connected at its radially inner end to primary ring 320 and at its radially outer end to primary ring retainer 370. These connections are fluid-tight to prevent leakage of the process fluid from the housing 312.

Referring to FIG. 4, the inner end of diaphragm 375 is defined by inner axial flange portion 380 axially directed in the outboard direction and terminating in an outboard edge 381. The diaphragm 375 includes a generally radial disc-like central portion 384 defining inboard radial surface 385 and outboard radial surface 386. It includes a radially outer rim portion 388.

Diaphragm radial central portion 384 is provided with a plurality of annular convolutions 376 formed of three inboard directed protrusions and two outboard directed protrusions. The radially innermost inboard directed protrusion defines a transition portion to axial flange portion 380. The radial outer inboard protrusion of the central portion 384 is joined to rim 388 by transition 389.

Diaphragm 375 is connected to primary ring retainer 370 by welding. A fluid-tight welded joint exists between the rim 374 of the retainer 370 and outer radial rim portion 388 of diaphragm portion 375.

Rim 388 of diaphragm 375 is positioned in overlying contact with rim 374 which includes a projection as in the embodiment of FIGS. 1 and 2 when projection welding is utilized. Appropriate welding electrodes contact the respective parts and upon passage of current cause rim 374 to be fused to diaphragm rim portion 388.

Primary ring 320 is secured to diaphragm 375 at axial flange 380 which has an inner diameter smaller than the diameter of cylindrical surface 377 to provide an interference fit. The flange 380 is frictionally received upon cylindrical surface 337 of the primary ring. Outboard edge 381 abuts radial surface 336 to fix the relationship between these two components and properly position rim portion 388 of the diaphragm relative to the seal face 321.

It is necessary that the connection of diaphragm 370 to ring 320 be fluid-tight and also sufficiently strong to resist torsional loads which result from the sliding engagement of face 321 with the mating face 319 of mating ring 318. While frictional interference fit may suffice, compounds such as described with reference to the embodiment of FIGS. 1 and 2 are also contemplated for use in this embodiment.

FIG. 7 is illustrative of an alternative connection between the radially inner end of diaphragm 375 and primary ring 320. Axially extending cylindrical surface 337 of ring 320 includes an arcuate annular relief 341 immediately adjacent the joinder of cylindrical surface 337 with annular radial surface 336.

Inner flange portion 380 of diaphragm 375 is formed with a curved shape which complements the arcuate annular relief 341. The innermost diameter of flange portion 380 is slightly smaller than the diameter at the bottom of annular relief 341. There is, therefore, an interference fit between these components. In addition, an appropriate binder or adhesive may be used to assure a fluid-tight seal and adequate resistance to torsional loading.

There is also illustrated in this embodiment radial undercut 339 which is an alternative to axial undercut 339 illustrated in FIG. 3. It performs the same function in each embodiment.

Figure 8:
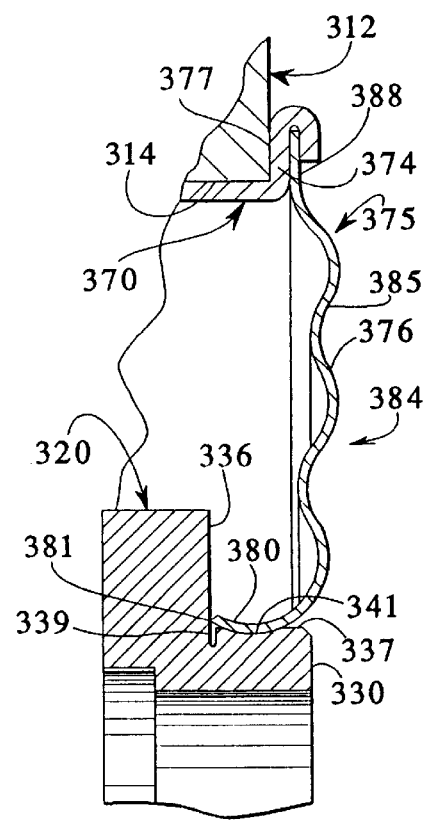
FIG. 8 is a fragmentary sectional view on an enlarged scale of a modified arrangement for portions of the apparatus illustrated in FIG. 3.
Figure 9:
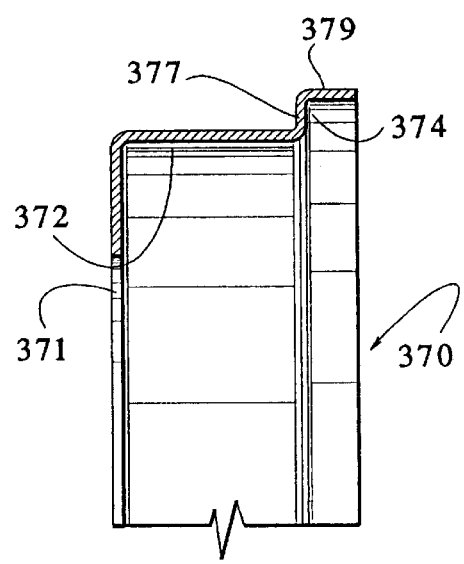
FIG. 9 is a view of a component of the seal arrangement illustrated in FIG. 8 prior to completion of assembly.

FIG. 8 shows a seal assembly which incorporates an alternative connection of the diaphragm 375 to rim 374 of retainer 370. Outer rim portion 388 of diaphragm 375 is of large enough to overlie a portion of rim 374 of retainer 370. Retainer 370 includes a rim originally configured as illustrated in FIG. 9. It includes an axial portion 379 extending from the radial rim 374. On assembly, axially extending portion 379 of rim 374 is rolled over to surround the outer peripheral edge of rim 388 to form a generally "U" shaped cross-section to clamp it to rim 374 of retainer 370.

The material of the stamped metal retainer 374 is sufficiently strong to secure the rim 388 of diaphragm 375 to rim 374. To assure a fluid-tight seal, an additional precaution of a suitable adhesive impervious to the fluid to be sealed may also be applied.

As in earlier embodiments, the diaphragm 375 of FIGS. 3, 4 and 8 is suitably made as a stamping or roll-formed part from stainless steel. It is expected that the thickness could range from 0.002 to 0.010 inches or more depending on shaft diameter seal size and particular material used. When placed in tension such a diaphragm possesses the requisite resiliency to provide the axial closing force upon the axial movable primary ring 320 to urge it into sealing engagement with mating ring 318. The disc-like shape with radial convolutions and tension loading assure that it applies a spring force which is sufficiently linear throughout the expected operating range of deflection to maintain adequate face loading yet avoid undue thermal stress on the rings.

As in the prior embodiments, diaphragm 375 is positioned such that radial central portion 384 closes off the inboard end of retainer body 370 at about the axial position of rim 374. Thus, seal ring 318 and 320 are disposed within the confines of the retainer 370 between radially outboard wall 371 and diaphragm 375. This unitized structure is of a minimal axial length as compared to conventional seals. Such a seal permits substantial overall reduction of the axial length of the housing of the equipment in which it is utilized. Since the axial length of the seal along the shaft is minimized shaft overhang and bearing spacing and size may also be reduced accordingly. In many applications, such as automotive water pumps, for example, the resultant weight savings and overall length reduction is a significant advantage.

When the seal is installed, the diaphragm 375 is inboard of seal rings 318 and 320. Inboard radial surface 385 is exposed to the fluid to be sealed which, when pump shaft 316 is rotating, is at operating pressure. The closing forces on the seal interface are the sum of the forces created by the restoring action of the deflected diaphragm and the fluid pressure acting on the disc-like central radial portion 384 along its inboard surface 385 as well as the inboard radial surface 330 of primary ring 320.

As in the embodiments of FIGS. 1 and 2, the seal 310 of the embodiment of FIG. 3 is preferably unitized, that is, the sleeve 340 and its associated mating ring 318 are captured within shell or retainer 370 between wall 371 and diaphragm 375 and its associated primary ring. As in the previous embodiments, the assembly is inserted into the pump over a free end of shaft 316. Such initial placement is aided by large diameter portion 354 of sleeve 340 which is of a diameter larger than shaft 316.

Shaft engaging portion 356 frictionally engages the outer surface of shaft 316. It is contemplated that an installation tool would be used which applies an axial force on the inboard edge of tubular elongate central portion 350 of sleeve 340 and upon rim 374 of retainer 370 to urge the separate components into appropriate relative positions.

When the seal assembly 310 is installed in its operating position as illustrated in FIGS. 3 and 8, the diaphragm 375 has been deflected so as to place it in tension. In relative terms, the radially innermost annular protrusion of convolutions 376 of the diaphragm 375 is moved inboard relative to its free state and with respect to the connection of the rim 388 to the retainer rim 374. Such deflection places the diaphragm 375 in tension between its connections respectively to the retainer rim 374 and of shoulder of primary ring 320. The restoring force created by this deflection of the stainless steel diaphragm imparts the requisite axial preload or closing force urging the sealing faces 318 and 320 into sliding, fluid-tight relation.

By way of illustration, a seal has been constructed in the form depicted in FIG. 3 utilizing the component configuration illustrated in FIGS. 4 and 5. The seal is suited for use in a water pump in which the water pressure operates at about 20 psi and can exceed 50 or more psi. The shaft of the pump is nominally 0.625 inches in diameter and the bore into which the retainer of the seal is pressed is about 1.435 inches, nominally.

The retainer 370 has an axial length from the surface 377 of rim 374 which contacts the housing wall adjacent bore 314 to the outboard surface of radial annular wall 371 of 0.338 inches. Central body portion 372 has an outer diameter of 1.440 inches.

The annular seal face 321 of ring 320 has 0.55 square inches of surface area which defines the interface with mating ring 318. It has an inner diameter of 0.812 inches and an outer circumferential surface 334 of 1.175 inches. The diameter of cylindrical surface 337 which retains diaphragm inner end flange 380 is 0.879 inches.

Stainless steel diaphragm 375 is 0.005 inches thick. It has an outer diameter at the outer circumferential periphery of rim 388 of 1.574 inches and an inner diameter at inner end axial flange 380 of 0.871 inches.

The convolutions of diaphragm 375 are formed by three annular protrusions directed inboard joined with two annular protrusions directed outboard in a sinusoidal fashion. The radially innermost inboard directed protrusion is tangent with and joins axial inner end flange 380. This radially innermost inboard protrusion is formed upon a 0.046 inch radius. The next radially outermost inboard directed protrusion is taken on a 0.046 inch radius. The third and radially outermost inboard directed protrusion is formed on a 0.039 inch radius. Transition 389 of a 0.046 inch radius joins this protrusion to rim 388.

The inboard directed projections are connected by radially spaced outboard directed protrusions. These projections are each formed upon a 0.046 inch radius.

The diaphragm 375 has a free height from the outboard edge 381 of inner end flange portion 380 to the inboard surface 385 at the radially outermost and next most radially outermost curves of 0.082 inches. That same dimension to the surface 385 at the radially innermost inboard facing curve is 0.075 inches. The distance from the outboard edge 381 of flange 380 to the surface of annular rim 388 which is affixed to rim 374 of retainer 370 is 0.051 inches.

The inner end flange portion 380 of diaphragm 375 is press fit onto cylindrical surface 337 of ring 320 and is disposed with axially outboard edge 381 of flange 380 in contact with radial surface 336. The interference fit of flange 380 with surface 337 is 0.008 inches on the diameter.

With the seal installed in a housing in surrounding relation to shaft in operative position as illustrated in FIG. 3 the diaphragm 375 is deflected in the inboard direction 0.050 inches from its free condition. That is, the outboard edge 381 of inner end flange 380 is displaced 0.050 inches in the inboard direction relative to its free state and relative to rim portion 388. This deflection causes the diaphragm to provide an axial preload upon the primary ring 320 of about eight pounds urging it toward the mating ring 318. When the pump is activated, the sealed fluid is pressurized to approximately twenty pounds per square inch within housing 314. This pressure acting upon the radial inboard surface 385 and radial face 330 causes the diaphragm 375 to exert an additional axial load upon the ring 320 of about twelve pounds urging it toward ring 318.

In seals of the type disclosed, as well as other seals using conventional forms of axial biasing, it is often desired to utilize a mating ring of silicon carbide or other ceramic which is banded with a metal band to impart compressive forces to the ceramic ring. Examples of such rings are found in U.S. Pat. Nos. 3,782,735 and 4,779,876.

FIGS. 10 and 11 illustrate banded ceramic mating ring assemblies which may be employed in the seal assembly of the embodiments of FIGS. 1, 2, 3 and 8. These ring assemblies are illustrative of the advantages achievable using projection welding techniques. Such techniques could also be employed with mating rings formed of other materials such as tungsten carbide or steam treated iron.

Referring to FIG. 10, there is illustrated a banded mating ring 518 of silicon carbide or other ceramic connected to a sleeve 540 to form a mating ring and seal subassembly which may be substituted, for example, for the sleeve and mating ring of the embodiments of FIGS. 1, 2, 3 or 8.

Mating ring 518 defines annular seal face 519 for a relatively rotatable sealing engagement with, for example, face 321 of the primary ring 320 of FIG. 3 or FIG. 8. Mating ring 518 includes outboard radial surface 522 and radially inner and radially outer cylindrical surfaces 524 and 526.

Annular band 590 surrounds mating ring 518 about radially outer cylindrical surface 526. Band 590 may be made of stainless steel or other suitable material. It is intended to apply a compressive load to the mating ring 518.

The diameter of cylindrical outer surface 526 is larger than the inner peripheral diameter of band 590. An interference fit is thus created between these surfaces. This fit also insures that ring 518 will not rotate relative to band 590. Torsional loads associated with the relative rotation of mating ring face 519 with the face 321 of primary ring 320 are thus transferred to band 590.

Band 590 includes radial portion 592. A projection 595 is formed either in the manner illustrated by the projection 73 on rim 74 illustrated in FIG. 5 or in the manner illustrated in FIG. 6.

Mating ring sleeve 540 includes tubular elongate portion 550 and radial ring retainer flange 546. Tubular elongate portion 550 is comprised of enlarged diameter outboard portion 554 to aid in installation on a shaft (not shown) and shaft engaging portion 556 intended to frictionally engage a shaft to create a driving relation between the shaft and the sleeve 540.

Ring retainer flange 546 is of a diameter large enough to overlie projection 595 formed on radial portion 592 of band 590.

To assemble the mating ring and sleeve, band 590 is initially pressed on to mating ring 518. The mating ring inner cylindrical surface is then positioned onto the large diameter outboard portion 554 of the tubular elongate portion 550 with outboard radial surface 522 in contact with radial flange 546 of sleeve 540. Suitable electrodes are applied to cause projection 595 to be fused with radial flange 546. It is contemplated that the welding operation will significantly diminish, or eliminate the projection 595.

FIG. 11 discloses a modified arrangement of a banded mating ring and sleeve combination. This combination is also suitable for substitution into the embodiments of the seal assembly illustrated in FIGS. 1, 2, 3 or 8.

Mating ring 618 defines seal face 619 for disposition in sliding sealing relation with a sealing face of a primary ring such as the face 321 of primary ring 320 of FIG. 3. Ring 618 also defines outboard radial surface 622 and radially inner and outer cylindrical surfaces 624 and 626.

Metal band 690 is channel shaped in cross-section. It surrounds seal ring 618 and includes radial wall 692 overlying outboard radial surface 622 of ring 618. It includes integrally formed radially innermost axial wall 694 engaged with surface 624 and radially outermost axial wall 696 engaged with radially outermost axial surface 626 of ring 618.

The radial spacing between walls 694 and 696 is such that the ring 618 is placed in compression between these walls. It is thought that such radially inward and radially outward compressive forces may improve the ability of the ring 618 to withstand operating stresses.

A sleeve 640 of the embodiment of FIG. 11 includes radial ring retainer flange 646. Two annular projections 698 are formed upon the inboard facing surface. They are spaced sufficiently such that each contacts radial wall 692 of band 690 somewhat radially inward of the juncture of wall 692 with the axially outer wall 696 and axially inner wall 694.

The inner peripheral diameter of radially inner axial wall 694 is such that it fits over the large diameter outboard portion 654 of tubular elongate portion 650 of sleeve 640.

To assemble the ring 618 onto sleeve 640 the projection welding process is employed to fuse the projections 698 to the radial wall 692 of band 690. Again, it is contemplated that the projections will be substantially eliminated during the welding process.

FIG. 12 illustrates yet another embodiment of a seal assembly 810 incorporating the principles of the present invention. As in earlier embodiments, seal rings 818 and 820 are respectively supported between shaft 816 and housing 812 by sleeve 840 and retainer 870.

The sleeve 840 retains mating ring 818 on shaft 816. It is essentially in the form of the sleeve depicted in FIG. 10 except for a slight modification of the ring retainer flange 846.

Ring 818 is a ceramic ring banded as in the embodiment of FIG. 10 by stainless steel band 890 which included radial portion 892 with projection 895. The other materials identified as suitable could be employed.

The flange 846 of the embodiment of FIG. 12 includes an outer annular, axially displaced radial portion 848 and integral transition portion 847 formed on an inboard directed angle relative to the radial ring retainer flange. This configuration is provided to aid in the manufacturing step of projection welding of projection 895 of radial portion 892 of band 890 to axially displaced radial portion 848 of ring retainer flange 846.

Retainer 870 is similar to the retainer depicted in the embodiment of FIG. 3. It includes an axial extending central body portion 872 and outboard radial wall 871. It includes radially directed rim 874 formed with radial portion 879. Rim 874 includes annular weld projection 873 similar to the projection illustrated in FIG. 5.

The primary seal ring is in a configuration that differs from prior embodiments. It comprises a seal ring 820 made of PTFE impregnated sintered bronze which defines seal face 821 for relatively rotating sealing engagement with face 819 of mating ring 818. Ring 820 is provided with stainless steel band 899 of "L" shaped cross-section secured to its inboard end at a shoulder defined by radial surface 836 and cylindrical surface 837. Band 899 includes an axial portion press fit onto axial surface 836 of brass primary ring 820 and a radial portion formed with an annular projection 893.

Primary ring 820 with band 890 is supported in seal assembly 810 by metal diaphragm 875. Diaphragm 875 includes radial disc-like central portion 884 formed with convolutions defined by adjoining inboard and outboard directed protrusions.

Diaphragm 875 includes outer rim 888. It further includes radially inner rim 880.

The outer rim 888 of diaphragm 375 is secured to rim 874 of retainer 870 by projection welding. Inner rim 880 is secured to band 899 on primary ring 820. These connections are fluid-tight and made by projection welding. It is contemplated that the projections 873 and 893 are essentially flattened during the welding process.

In its installed condition diaphragm 875 is in tension to impart an axial preload onto the interface between seal faces 819 and 821. That is, the radially innermost end of the diaphragm is deflected in the inboard direction relative to its free state.

FIG. 13 depicts a further modified embodiment of a seal assembly in accordance with the principles of the present invention. Seal assembly 910 is disposed between housing 912 and shaft 916. Retainer 970 supports primary ring 920 within the housing.

Sleeve 940 secures a banded mating ring 918 for rotation with shaft. The sleeve 940 and banded mating ring 918 are configured as the sleeve 840 and banded mating ring of the embodiment of FIG. 12.

Seal rings 918 and 920 define seal faces 919 and 921 which define the seal interface. Metal diaphragm 975 is connected between flange 974 on retainer 970 and seal ring 920 in fluid-tight relation by welding. It includes a radial disc-like central portion 984 formed of inboard directed annular protrusions and integrally formed outboard directed annular protrusions. In the installed condition the radially innermost protrusion of diaphragm 975 is deformed in the inboard direction relative to its free state to place it in tension as in prior embodiments.

Primary ring 920 is made of brass and is generally rectangular in cross-section. It includes band 999 secured to its inboard end which is shaped similarly to band 690 of the embodiment of FIG. 11 and includes radial portion 992 and radially inner and radial outer axial walls 996 and 994. Made of stainless steel, band 999 is connected to ring 920 by an interference fit between the axial walls 996 and 994 and radial outer and inner axial surfaces of ring 920.

Diaphragm 975 includes radial outer ring 988 welded to rim 974 of retainer 970. It further includes generally radial disc-like central portion 984 formed with convolutions. Radially inner rim 980 is generally radial and is welded to radial portion 992 of band 999.

FIG. 14 depicts a seal assembly 410 which differs from prior embodiments in that it is not unitized. The device to be sealed includes housing 412 defining bore 414 which surrounds shaft 416.

A radial seal face 419 is formed on shaft 416 by shoulder 418. Alternatively, a separate ring defining face 419 could be pressed onto a shaft of uniform diameter.

Seal ring 420 which defines seal face 421 includes metal band 499. Face 421 defines a sealing interface with face 419.

Metal diaphragm 475, made of stainless steel, includes generally radial disc-like central portion 484 having a plurality of convolutions defined by inboard and outboard annular protrusions. It includes a radially outer rim 488 secured to housing 412 in fluid-tight relation as by welding. Its radially inner end is connected to seal ring 420 in fluid-tight relation. In the illustrated embodiment radial inner rim 480 is welded to a band 499 on seal ring 420. Alternatively, a suitable adhesive or sealant could be used to join these components.

In the installed condition the radially innermost protrusion of central portion 484 of diaphragm 475 is deformed in the inboard direction relative to its free state to create a restoring force urging face 421 toward face 419 to define the relatively rotating seal interface.

Various features of the invention have been shown in the drawings and described in the specification. It must be understood, however, that modifications may be made without departing from the scope of the invention defined by the appended claims.

I claim:

1. A mechanical end face seal assembly to provide a fluid tight seal between a housing defining a bore and a rotatable shaft extending through the bore, said seal assembly comprising:

an annular seal ring and a generally annular sleeve secured to said seal ring adapted to be connected to the shaft;

said sleeve defining a shaft engaging tubular elongate portion for rotational engagement with the shaft and a receptacle portion spaced from said shaft engaging portion, said annular seal ring connected to said sleeve is further connected to said receptacle portion in fluid tight relation;

another annular seal ring and a generally annular retainer adapted to connect said another annular seal ring to said housing, said retainer including an inboard end and an outboard end;

said rings each having an annular, generally radially directed seal face in facing relation to the seal face of the other ring to define a sealing interface therebetween, said seal interface being disposed intermediate said inboard end and outboard ends of said retainer;

a generally annular, resilient, flexible metal diaphragm having a circumferential end portion for connection to one of said shaft and housing and a circumferential end portion connected to one of said seal rings wherein said generally circumferential end portion of said diaphragm adapted to connect said associated seal ring to said one of said shaft and housing is connected to one of said retainer and said sleeve, and said diaphragm being resiliently deformable to apply an axial biasing force upon said ring connected thereto to urge said seal face thereof toward the seal face of the other of said rings, wherein said resilient deformation places said diaphragm in tension between said circumferential end portions.

2. A mechanical end face seal assembly as claimed in claim 1 wherein, resilient deformation of said diaphragm to place said diaphragm in tension increases the axial distance between said circumferential end portion adapted for connection to said one of said shaft and housing and said circumferential end portion connected to said seal ring.

3. A mechanical end face seal assembly as claimed in claim 2 wherein said diaphragm includes a generally radial disc-like central portion defining at least one annular convolution.

4. A mechanical end face seal assembly as claimed in claim 3 wherein said generally radial disc-like central portion includes a plurality of convolutions defined by adjacent inboard and outboard directed protrusions.

5. A mechanical end face seal assembly as claimed in claim 1 wherein, said sleeve is adapted to connect one of said rings to the shaft, and said retainer is adapted to connect said other of said rings to the housing, and wherein said circumferential end portion of said diaphragm connected to said retainer defines the radially outer circumferential end of said diaphragm and said circumferential end portion connected to said seal ring defines the radially inner circumferential end of said diaphragm.

6. A mechanical end face seal as claimed in claim 5 wherein said outer circumferential end portion of said diaphragm is connected to said inboard end of said retainer.

7. A mechanical end face seal assembly as claimed in claim 6 wherein said retainer includes a radially outwardly directed rim at its inboard end and said circumferential end portion of said diaphragm connected to said retainer includes a peripheral rim secured to said radially outward directed rim of said retainer.

8. A mechanical end face seal assembly as claimed in claim 7 wherein said connection between said rim of said retainer and said rim of said diaphragm is a welded connection.

9. A mechanical end face seal assembly as claimed in claim 8 wherein said connection between said rim of said retainer and said rim of said diaphragm is accomplished by projection welding.

10. A mechanical end face seal assembly as claimed in claim 6 wherein said retainer defines an axially extending central body portion between said inboard end and said outboard end adapted for disposition in the bore of the housing in fluid tight relation.

11. A mechanical end face seal assembly as claimed in claim 10 wherein said retainer includes an inwardly directed radial annular wall adjacent said outboard end thereof having an aperture therein adapted to surround the shaft, said aperture has a diameter smaller than the outer diameter of said seal ring connected to said sleeve, and wherein said diaphragm urges said seal ring faces together at said interface, and said receptacle portion of said sleeve toward said radial wall, and wherein said diaphragm defines an outboard surface facing said radial annular wall and an inboard surface adapted to be exposed to the fluid to be sealed.

12. A mechanical end face seal assembly as claimed in claim 10 wherein said retainer includes a radially outwardly directed rim at its inboard end and said circumferential end portion of said diaphragm connected to said retainer includes a peripheral rim secured to said radially outward directed rim of said retainer wherein said connection between said rim of said retainer and said rim of said diaphragm is a welded connection.

13. A mechanical end face seal assembly as claimed in claim 12 wherein said connection between said rim of said retainer and said rim of said diaphragm is accomplished by projection welding.

14. A mechanical end face seal assembly as claimed in claim 11 wherein said retainer includes a radially outwardly directed rim at its inboard end and said circumferential end portion of said diaphragm connected to said retainer includes a peripheral rim secured to said radially outward directed rim of said retainer wherein said connection between said rim of said retainer and said rim of said diaphragm is a welded connection.

15. A mechanical end face seal assembly as claimed in claim 14 wherein said connection between said rim of said retainer and said rim of said diaphragm is accomplished by projection welding.

16. A mechanical end face seal assembly as claimed in claim 1 wherein said ring connected to said diaphragm includes an axially extending cylindrical surface, said circumferential portion of said diaphragm connected to said ring defines an axially extending flange portion secured to said cylindrical surface of said ring by interference fit.

17. A mechanical end face seal as claimed in claim 16 wherein said circumferential portion defining said axially extending flange portion of said diaphragm is initially formed in a conical shape and on connection to said ring is deformed to overlie said cylindrical surface on said ring.

18. A mechanical end face seal as claimed in claim 17 wherein said ring connected to said diaphragm includes a radial annular surface adjacent said axially extending cylindrical surface spaced from said seal face of said ring, and said diaphragm includes a convolution forming protrusion adjacent said circumferential portion defined by said axially extending flange portion with said protrusion abutting said radial surface of said ring.

19. A mechanical end face seal as claimed in claim 18 wherein said radial surface of said ring is connected to said cylindrical surface by a filet and wherein said protrusion on said diaphragm abutting said radial surface is formed on a radius larger than the radius of said filet.

20. A mechanical end face seal assembly as claimed in claim 16 wherein, said sleeve is adapted to connect one of said rings to the shaft, and said retainer is adapted to connect said other of said rings to the housing, and wherein said circumferential end portion of said diaphragm connected to said retainer defines the radially outer circumferential end of said diaphragm and said circumferential end portion connected to said seal ring defines the radially inner circumferential end portion of said diaphragm, said retainer has an inboard end and an outboard end, and said outer circumferential end portion of said diaphragm is connected to said inboard end of said retainer.

21. A mechanical end face seal as claimed in claim 20 wherein said circumferential portion defining said axially extending flange portion of said diaphragm is initially formed in a conical shape and on connection to said ring is deformed to overlie said cylindrical surface on said ring.

22. A mechanical end face seal as claimed in claim 21 wherein said ring connected to said diaphragm includes a radial annular surface adjacent said axially extending cylindrical surface spaced from said seal face of said ring, and said diaphragm including a convolution forming protrusion adjacent said circumferential portion defined by said axially extending flange portion with said protrusion abutting said radial surface of said ring.

23. A mechanical end face seal as claimed in claim 22 wherein said radial surface of said ring is connected to said cylindrical surface by a filet and wherein said protrusion on said diaphragm abutting said radial surface is formed on a radius larger than the radius of said filet.

24. A mechanical end face seal assembly as claimed in claim 20 wherein said retainer defines an axially extending central body portion between said inboard end and said outboard end adapted for disposition in the bore of the housing in fluid tight relation, said sleeve defines a receptacle portion and a shaft engaging tubular elongate portion for rotational engagement with the shaft, said seal ring is connected to said receptacle portion in fluid tight relation, said seal interface is disposed intermediate said inboard end and outboard end of said retainer, said retainer includes an inwardly directed radial annular wall adjacent said outboard end thereof having an aperture therein adapted to surround the shaft, said aperture has a diameter smaller than the outer diameter of said seal ring connected to said sleeve, and wherein said diaphragm urges said seal ring faces together at said interface, and said receptacle portion of said sleeve toward said radial wall, and wherein said diaphragm defines an outboard surface facing said radial annular wall and an inboard surface adapted to be exposed to the fluid to be sealed.

25. A mechanical end face seal assembly as claimed in claim 24 wherein said retainer includes a radially outwardly directed rim at its inboard end and said circumferential end portion of said diaphragm connected to said retainer includes a peripheral rim secured to said radially outward directed rim of said retainer wherein said connection between said rim of said retainer and said rim of said diaphragm is a welded connection.

26. A mechanical end face seal assembly as claimed in claim 25 therein said connection between said rim of said retainer and said rim of said diaphragm is accomplished by projection welding.

27. A mechanical end face seal assembly as claimed in claim 6 wherein said diaphragm includes a generally radial disc-like central portion defining at least one annular convolution.

28. A mechanical end face seal assembly as claimed in claim 27 wherein said generally radial disc-like central portion includes a plurality of convolutions defined by adjacent inboard and outboard directed protrusions.

29. A mechanical end face seal assembly as claimed in claim 7 wherein said diaphragm includes a generally radial disc-like central portion defining at least one annular convolution.

30. A mechanical end face seal assembly as claimed in claim 29 herein said generally radial disc-like central portion includes a plurality of convolutions defined by adjacent inboard and outboard directed protrusions.

31. A mechanical end face seal assembly as claimed in claim 11 wherein said diaphragm includes a generally radial disc-like central portion defining at least one annular convolution.

32. A mechanical end face seal assembly as claimed in claim 31 wherein said generally radial disc-like central portion includes a plurality of convolutions defined by adjacent inboard and outboard directed protrusions.

33. A mechanical end face seal assembly as claimed in claim 16 wherein said diaphragm includes a generally radial disc-like central portion defining at least one annular convolution.

34. A mechanical end face seal assembly as claimed in claim 33 wherein said generally radial disc-like central portion includes a plurality of convolutions defined by adjacent inboard and outboard directed protrusions.

35. A mechanical end face seal assembly as claimed in claim 18 wherein said diaphragm includes a generally radial disc-like central portion defining at least one annular convolution.

36. A mechanical end face seal assembly as claimed in claim 35 wherein said generally radial disc-like central portion includes a plurality of convolutions defined by adjacent inboard and outboard directed protrusions.

37. A mechanical end face seal assembly as claimed in claim 19 wherein said diaphragm includes a generally radial disc-like central portion defining at least one annular convolution.

38. A mechanical end face seal assembly as claimed in claim 37 wherein said generally radial disc-like central portion includes a plurality of convolutions defined by adjacent inboard and outboard directed protrusions.

39. A mechanical end face seal as claimed in claim 7 wherein said rim of said retainer includes an axially extending cylindrical portion ovelrying said peripheral rim of said diaphragm and having an internal diameter slightly larger than the diameter of said peripheral rim.

40. A method of making a mechanical end face seal for providing a fluid-tight seal between a bore in a housing and a relatively rotatable shaft extending therethrough comprising:

(a) providing a pair of relatively rotatable seal rings having radial sealing faces defining a sealing interface therebetween, (b) providing a sleeve defining a shaft engaging tubular elongate portion adapted to be secured to said shaft for rotating therewith and a receptacle portion having a radially extending flange for securing one of said rings thereto, (c) providing a retainer adapted to be disposed in the bore of the housing in surrounding relation to the shaft, which retainer includes a generally cylindrical body portion having an inboard end and an outboard end, a radially directed rim, and a radially directed flange adjacent the outboard end defining a central aperture having a diameter smaller than the outer diameter of the ring secured to said sleeve, (d) providing a generally annular radially directed flexible metal diaphragm and securing said diaphragm to the other of said relatively rotatable rings, (e) disposing said sleeve and said ring connected thereto within the body of said retainer, (f) positioning said ring connected to said diaphragm so as to define a sealing interface with the ring connected to said sleeve, and (g) connecting said diaphragm to said retainer at said radially directed rim with the radially extending annular portion disposed at said inboard end of said retainer and with said sealing interface disposed intermediate said diaphragm and said radial wall of said retainer.

41. A method of making a mechanical end face seal assembly as claimed in claim 40 comprising forming a rim at the inboard end of said retainer body portion, providing an annular rim on said diaphragm at its outer periphery, affixing said rim of said diaphragm to said rim of said retainer.

42. A method of making a mechanical end face seal as claimed in claim 41 comprising forming said rim of said retainer radially outwardly of said generally cylindrical body portion, forming a projection thereon, positioning said diaphragm such that said rim thereof overlies said projection, causing said rim of said retainer to be welded to said rim of said diaphragm at said projection.

43. A method of making a mechanical end face seal as claimed in claim 40 comprising forming at least one annular convolution in said diaphragm intermediate said connection to said retainer and said connection to said seal ring prior to making said connection.

44. A method of making a mechanical end face seal as claimed in claim 40 comprising forming a plurality of radially spaced convolutions in said diaphragm intermediate the connection of said diaphragm to said retainer and to said ring prior to making said connection.

45. A mechanical end face seal assembly to provide a fluid tight seal between a housing defining a bore and a rotatable shaft extending through the bore, said seal assembly comprising:

an annular seal ring adapted to be connected to one of the housing and shaft;

an annular seal ring adapted to be connected to the other of said housing and shaft;

said seal rings each having an annular, generally radially directed seal face in facing relation to the seal face of the other ring to define a sealing interface therebetween;

a generally annular, resilient, flexible diaphragm having a circumferential end portion for connection to one of said shaft and housing and a circumferential end portion connected to one of said seal rings, said diaphragm being resiliently deformable to apply an axial biasing force upon said ring connected thereto to urge said seal face thereof toward the seal face of the other of said rings, and said diaphragm including a generally radial disc-like central portion having a plurality of convolutions defined by oppositely directed protrusions;

a generally annular retainer connected to said circumferential end portion of said diaphragm for connection thereof to said one of said shaft and housing, wherein said retainer includes a radially directed rim and said circumferential end portion of said diaphragm connected to said retainer includes a peripheral rim secured to said radially directed rim of said retainer.

46. A mechanical end face seal assembly as claimed in claim 45 wherein said diaphragm includes at least two protrusions in a first axial direction, and at least one protrusion directed in the opposite axial direction interposed between said protrusions in said first axial direction wherein said at least one protrusion in said opposite axial direction merges with said protrusions in said first axial direction at a tangent of the radii of adjacent protrusions.

47. A mechanical end face seal assembly as claimed in claim 46 wherein said diaphragm includes at least two protrusions formed in said axial direction opposite to said first axial direction one of which merges with said circumferential end portion adapted for connection to said one of said shaft and housing.

48. A mechanical end face seal assembly as claimed in claim 46 wherein said one of said protrusions formed in said first axial direction merges with said circumferential end portion connected to said seal ring.

49. A mechanical end face seal assembly as claimed in claim 47 wherein said one of said protrusions formed in said first axial direction merges with said circumferential end portion connected to said seal ring.

50. A mechanical end face seal assembly as claimed in claim 45 wherein said assembly includes:

a generally annular sleeve secured to one of said rings, said sleeve adapted to connect said ring to the shaft, and said retainer is adapted to connect said other of said rings to the housing, and wherein said circumferential end portion of said diaphragm connected to said retainer defines the radially outer circumferential end of said diaphragm and circumferential end portion connected to said seal ring defines the radially inner circumferential end of said diaphragm.

51. A mechanical end face seal assembly as claimed in claim 45 wherein said connection between said rim of said retainer and said rim of said diaphragm is a welded connection.

52. A mechanical end face seal assembly as claimed in claim 51 wherein said connection between said rim of said retainer and said rim of said diaphragm is accomplished by projection welding.

53. A mechanical end face seal as claimed in claim 50 wherein said ring connected to said diaphragm includes an axially extending cylindrical surface, said circumferential end portion of said diaphragm connected to said ring defines an axially extending flange portion secured to said cylindrical surface of said ring by interference fit.

54. A mechanical end face seal as claimed in claim 53 wherein said ring connected to said diaphragm including a radial annular surface adjacent said axially extending cylindrical surface, and wherein said one of said protrusions formed in a first axial direction which merges with said circumferential end portion connected to said seal ring is disposed adjacent said radial annular surface and said axially extending flange portion of said diaphragm extends axially away from said radial annular surface of said ring.

55. A mechanical end face seal as claimed in claim 53 wherein said axially extending cylindrical surface includes a fluid impervious coating intermediate said surface and said flange portion of said diaphragm.

56. A mechanical end face seal as claimed in claim 54 wherein said axially extending cylindrical surface includes a fluid impervious coating intermediate said surface and said flange portion of said diaphragm.

57. A mechanical end face seal assembly as claimed in claim 45 wherein said protrusions directed in a first axial direction define crests which lie in a common radial plane perpendicular to the centerline of said diaphragm.

58. A mechanical end face seal assembly as claimed in claim 57 wherein resilient deformation of said diaphragm causes said crests which lie in a common radial plane to lie in a conical surface converging at the centerline of said diaphragm.

59. A mechanical end face seal assembly as claimed in claim 57 wherein said protrusion which merges with said circumferential end portion adapted for connection to one of said shaft and housing is formed on a radius smaller than the other protrusions defining said convolutions.

60. A mechanical end face seal assembly to provide a fluid tight seal between a housing defining a bore and a rotatable shaft extending through the bore, said seal assembly comprising:

an annular seal ring adapted to be connected to one of the housing and shaft;

an annular seal ring adapted to be connected to the other of said housing and shaft, said rings each having an annular, generally radially directed seal face in facing relation to the seal face of the other ring to define a sealing interface therebetween;

a generally annular, resilient, flexible metal diaphragm having a circumferential end portion for connection to one of said shaft and housing and a circumferential end portion connected to one of said seal rings, said diaphragm being resiliently deformable to apply an axial biasing force upon said ring connected thereto to urge said seal face thereof toward the seal face of the other of said rings, and said diaphragm including a generally radial disc-like central portion having a plurality of convolutions defined by oppositely directed protrusions; and a generally annular retainer connected to said circumferential end portion of said diaphragm for connection thereof to said one of said shaft and housing, said retainer having an end inboard relative to the fluid to be sealed, and said outer circumferential end portion of said diaphragm is connected to said inboard end of said retainer, wherein said retainer defines an axially extending central body portion between said inboard end and said outboard end adapted for disposition in the bore of the housing in fluid tight relation, and said seal interface between said seal ring faces is disposed intermediate said inboard end and outboard ends of said retainer.

61. A mechanical end face seal assembly as claimed in claim 60 wherein said retainer includes an inwardly directed radial annular wall adjacent said outboard end thereof having an aperture therein adapted to surround the shaft, said aperture has a diameter smaller than the outer diameter of said seal ring connected to said sleeve, and wherein said diaphragm urges said seal ring faces together at said interface and further urges said receptacle portion of said sleeve toward said radial wall, and wherein said diaphragm defines an outboard surface facing said radial annular wall and an inboard surface adapted to be exposed to the fluid to be sealed.

62. A mechanical end face seal assembly as claimed in claim 61 wherein said retainer includes a radially outwardly directed rim at its inboard end and said circumferential end portion of said diaphragm connected to said retainer includes a peripheral rim secured to said radially outward directed rim of said retainer.

63. A mechanical end face seal assembly as claimed in claim 62 wherein said connection between said rim of said retainer and said rim of said diaphragm is a welded connection.

64. A mechanical end face seal assembly as claimed in claim 63 wherein said connection between said rim of said retainer and said rim of said diaphragm is accomplished by projection welding.

65. A mechanical end face seal assembly as claimed in claim 60 herein said ring connected to said diaphragm includes an axially extending cylindrical surface and said circumferential portion of said diaphragm connected to said ring defines an axially extending flange portion secured to said cylindrical surface of said ring by interference fit.

66. A mechanical end face seal as claimed in claim 65 wherein said circumferential portion defining said axially extending flange portion of said diaphragm is initially formed in a conical shape and on connection to said ring is deformed to overlie said cylindrical surface on said ring.

67. A mechanical end face seal as claimed in claim 66 wherein said ring connected to said diaphragm includes a radial annular surface adjacent said axially extending cylindrical surface spaced from said seal face of said ring, and said diaphragm includes a convolution forming protrusion adjacent said circumferential portion defined by said axially extending flange portion with said protrusion abutting said radial surface of said ring.

68. A mechanical end face seal as claimed in claim 67 wherein said radial surface of said ring is connected to said cylindrical surface by a filet and wherein said protrusion on said diaphragm abutting said radial surface is formed on a radius larger than the radius of said filet.

* * * * *